United States Patent
Mulye

(10) Patent No.: US 9,194,339 B2
(45) Date of Patent: Nov. 24, 2015

(54) INTERNALLY COOLED HIGH COMPRESSION LEAN-BURNING INTERNAL COMBUSTION ENGINE

(71) Applicant: NOSTRUM ENERGY PTE, LTD., Singapore (SG)

(72) Inventor: Nirmal Mulye, Kendall Park, NJ (US)

(73) Assignee: Nostrum Energy Pte, Otd., Singapore (SG)

( * ) Notice: Subject to any disclaimer, the term of this patent is extended or adjusted under 35 U.S.C. 154(b) by 0 days.

(21) Appl. No.: 14/598,935

(22) Filed: Jan. 16, 2015

(65) Prior Publication Data

US 2015/0128897 A1 May 14, 2015

Related U.S. Application Data

(63) Continuation of application No. 13/444,533, filed on Apr. 11, 2012, now Pat. No. 8,935,996.

(60) Provisional application No. 61/474,240, filed on Apr. 11, 2011.

(51) Int. Cl.
*F02B 47/02* (2006.01)
*F02M 25/03* (2006.01)
(Continued)

(52) U.S. Cl.
CPC .............. *F02M 25/03* (2013.01); *F02B 47/02* (2013.01); *F02M 25/022* (2013.01);
(Continued)

(58) Field of Classification Search
CPC ......... F02B 47/02; F02B 47/00; F02M 25/03; F02M 25/022; F02M 25/025; Y02T 10/121; Y02T 10/16
USPC ......... 123/25 C, 25 A, 568.11; 60/775, 39.53
See application file for complete search history.

(56) References Cited

U.S. PATENT DOCUMENTS 197,989 A 12/1877 Bogert
3,180,324 A 4/1965 Stone
(Continued)

FOREIGN PATENT DOCUMENTS

CN 1643244 A 7/2005
DE 36 18 700 A1 12/1987
(Continued)

OTHER PUBLICATIONS

Wilson, J.P., "Effects of Water Injenction and Increased Compression Ratio in a Gasoline Spark Ignition Engine", Masters Thesis, University of Idaho, pp. 1-76 (2011).
(Continued)

*Primary Examiner* — Lindsay Low
*Assistant Examiner* — Grant Moubry
(74) *Attorney, Agent, or Firm* — Scully, Scott, Murphy & Presser, P.C.

(57) ABSTRACT

An internally cooled internal combustion piston engine and method of operating a piston engine is provided, with the combination of liquid water injection, higher compression ratios than conventional engines, and leaner air fuel mixtures than conventional engines. The effective compression ratio of the engines herein is greater than 13:1. The engines may employ gasoline or natural gas and use spark ignition, or the engines may employ a diesel-type fuel and use compression ignition. The liquid water injection provides internal cooling, reducing or eliminating the heat rejection to the radiator, reduces engine knock, and reduces NOx emissions. The method of engine operation using internal cooling with liquid water injection, high compression ratio and lean air fuel mixture allow for more complete and efficient combustion and therefore better thermal efficiency as compared to conventional engines.

21 Claims, 11 Drawing Sheets

(51) Int. Cl.
*F02M 25/022* (2006.01)
*F02M 25/025* (2006.01)
*F02M 25/035* (2006.01)
*F01P 3/00* (2006.01)

(52) U.S. Cl.
CPC .......... *F02M 25/025* (2013.01); *F02M 25/035* (2013.01); *F01P 2003/001* (2013.01); *Y02T 10/121* (2013.01); *Y02T 10/16* (2013.01)

(56) References Cited

U.S. PATENT DOCUMENTS

| | | | |
|---|---|---|---|
| 3,651,641 A | 3/1972 | Ginter | |
| 4,120,268 A | 10/1978 | Bastenhof | |
| 4,133,628 A | 1/1979 | Morrison | |
| 4,143,518 A | 3/1979 | Kellogg-Smith | |
| 4,408,573 A | 10/1983 | Schlueter et al. | |
| 4,552,106 A | 11/1985 | Spence | |
| 4,558,665 A | 12/1985 | Sandberg et al. | |
| 4,884,533 A | 12/1989 | Risitano et al. | |
| 5,012,772 A | 5/1991 | Nakamura | |
| 5,261,238 A | 11/1993 | Olsen | |
| 5,718,194 A | 2/1998 | Binion | |
| 5,743,080 A | 4/1998 | Ginter | |
| 5,937,799 A | 8/1999 | Binion | |
| 6,082,311 A | 7/2000 | Collin | |
| 6,170,441 B1 | 1/2001 | Haldeman et al. | |
| 6,289,666 B1 | 9/2001 | Ginter | |
| 6,289,853 B1 | 9/2001 | Walczak et al. | |
| 6,311,651 B1 | 11/2001 | Singh | |
| 6,564,556 B2 | 5/2003 | Ginter | |
| 6,571,749 B2 | 6/2003 | Singh | |
| 6,698,387 B1 | 3/2004 | McFarland et al. | |
| 6,892,680 B2 | 5/2005 | Lee | |
| 6,895,945 B2 | 5/2005 | Parsa | |
| 7,021,272 B2 | 4/2006 | Singh | |
| 7,225,787 B2 | 6/2007 | Bromberg et al. | |
| 7,318,858 B2 | 1/2008 | Parsa | |
| 7,367,306 B1 | 5/2008 | Holden | |
| 7,444,987 B2 | 11/2008 | Cohn et al. | |
| 7,513,222 B2 | 4/2009 | Orlosky | |
| 7,523,603 B2 | 4/2009 | Hagen et al. | |
| 7,533,651 B2 * | 5/2009 | Surnilla | 123/304 |
| 7,574,983 B2 | 8/2009 | Kuo | |
| 7,640,913 B2 | 1/2010 | Blumberg et al. | |
| 7,640,915 B2 | 1/2010 | Cohn et al. | |
| 7,726,265 B2 | 6/2010 | Bromberg et al. | |
| 7,730,872 B2 | 6/2010 | Leone et al. | |
| 7,739,985 B2 | 6/2010 | Keays | |
| 7,740,004 B2 | 6/2010 | Cohn et al. | |
| 7,762,233 B2 | 7/2010 | Cohn et al. | |
| 7,793,638 B2 | 9/2010 | Sturman | |
| 7,798,119 B2 | 9/2010 | Keays | |
| 7,841,325 B2 | 11/2010 | Cohn et al. | |
| 7,938,103 B2 | 5/2011 | Keays | |
| 7,954,472 B1 | 6/2011 | Sturman | |
| 7,958,864 B2 | 6/2011 | Sturman | |
| 7,958,872 B1 | 6/2011 | Schechter | |
| 8,069,839 B2 | 12/2011 | Cohn et al. | |
| 8,082,735 B2 | 12/2011 | Bromberg et al. | |
| 8,479,690 B2 | 7/2013 | Maro et al. | |
| 2002/0043222 A1 | 4/2002 | Singh | |
| 2003/0188700 A1 | 10/2003 | Mitsuhashi et al. | |
| 2003/0192489 A1 | 10/2003 | Singh | |
| 2004/0003781 A1 | 1/2004 | Yuki et al. | |
| 2005/0279333 A1 | 12/2005 | Kweon et al. | |
| 2006/0037563 A1 * | 2/2006 | Raab et al. | 123/25 C |
| 2006/0124079 A1 | 6/2006 | Singh | |
| 2007/0022977 A1 | 2/2007 | Crower | |
| 2007/0137191 A1 | 6/2007 | Kweon et al. | |
| 2008/0223332 A1 | 9/2008 | Maro et al. | |
| 2009/0194042 A1 * | 8/2009 | Workman et al. | 123/3 |
| 2010/0077987 A1 | 4/2010 | Voisin | |

FOREIGN PATENT DOCUMENTS

| | | |
|---|---|---|
| GB | 1 487 782 | 10/1977 |
| WO | 2007/142927 A2 | 12/2007 |
| WO | WO 2010002737 A1 | 1/2010 |
| WO | WO 2010131225 A1 | 11/2010 |

OTHER PUBLICATIONS

Cardu, M., et al., "Gas turbine installation with total water injection in the combustion chamber", Energy Conversion and Management, 43:2395-2404 (2002).

Coney, M.W., et al., "A thermodynamic analysis of a novel high-efficiency reciprocating internal combustion engine—the isoengine", Energy, 29:2585-2600 (2004).

Kuo, P. S., "Cylinder Pressure in a Spark-Ignition Engine: A Computational Model", J. Undergrad. Sci. 3:141-145 (Fall 1996).

http://www.rbracing-rsr.comtwaterinjection.html, accessed Apr. 2, 2012, pp. 1-32, RSR Pro 440 Turbo Water Injection.

Jannell, T. A. P., Bachelor Degree in Maritime Operations (BMO), MA9022, Diesel Technology & Emissions, Assignment 2: Direct Water Injection, Singapore Polytechnic, Singapore Maritime Academy & Maritime Institute of William Barentsz, Jan. 8, 2006, pp. 1-6.

http://mandieselturbo.com/files/news/filesof15316/HAM_PS_Brochure_May2011.pdf, accessed Jul. 10, 2012, "Humid Air Motor Technology for green profits", MAN, pp. 2-10.

International Search Report mailed Jul. 13, 2012 for International Application No. PCT/US12/33088.

Supplementary European Search Report dated Jun. 15, 2015, issued in Application No. EP 12 77 2025.

* cited by examiner

| Combination | Direct Water | Direct Fuel | Port Water | Port Fuel | Turbo | Spark Ignition | Drawing |
|---|---|---|---|---|---|---|---|
| 1 | X | X | | | X | X | X |
| 2 | X | X | | | | X | X |
| 3 | X | X | | | X | | |
| 4 | X | X | | | | | |
| 5 | X | | | X | X | X | |
| 6 | X | | | X | | X | |
| 7 | X | | | X | X | | |
| 8 | X | | | X | | | |
| 9 | | X | X | | X | X | |
| 10 | | X | X | | | X | |
| 11 | | X | X | | | | |
| 12 | | X | X | | | | |
| 13 | | | X | X | X | X | X |
| 14 | | | X | X | | X | X |
| 15 | | | X | X | X | | |
| 16 | | | X | X | | | |
| 17 | Dual Water/Fuel Injection | | | | X | X | X |

Figure 2

INTERNALLY COOLED HIGH COMPRESSION LEAN-BURNING INTERNAL COMBUSTION ENGINE

CROSS-REFERENCE TO RELATED APPLICATIONS

This application is a continuation application of U.S. patent application Ser. No. 13/444,533 filed Apr. 11, 2012 which application claims priority under 35 U.S.C. §119(e) of U.S. Provisional Patent Application Ser. No. 61/474,240, filed Apr. 11, 2011, the disclosures of which are hereby incorporated by reference in its entirety.

BACKGROUND

The present disclosure pertains to the field of internal combustion engines, including engines for motor vehicles, railways, ships, aircraft, or electrical power generation.

This disclosure pertains to internal combustion engines that operate far more efficiently than conventional engines. The principles set forth herein can be used in both spark-ignition (SI) engines typically operating on gasoline (petrol), ethanol or natural gas, or on compression-ignition engines, which typically are diesel engines.

The engine literature describes a number of factors that affect engine efficiency. These can be divided into theoretical limits based on the second law of thermodynamics, namely the temperature differential (gradient) that determines efficiency in the Carnot cycle, and compression ratio which is the most pertinent variable in Otto cycle efficiency. Other factors are important, including mechanical factors such as friction and chemical factors such as fuel properties. Fuel properties depend on the chemical makeup of the fuel, the stoichiometry, vaporization of liquid fuels, and other factors, including the combustion temperature, ignition energy and ignition delay, flame propagation velocity, and completeness of combustion.

Internal combustion engines are heat engines, whose behavior can be described in the ideal limit by the laws of thermodynamics. The work and thermal energy of any heat driven process can be described by the first law of thermodynamics as:

$$Q_{in} = W_{out} + Q_{out}$$

where $Q_{in}$ is thermal energy put into the engine, and mechanical energy, or work is $W_{out}$. A cyclic heat engine, even in the ideal limit, cannot completely convert the net heat input into work output, so some of the input heat energy has to be dissipated into the environment as waste heat $Q_{out}$. The thermal efficiency of a cyclic heat engine is defined as:

$$\eta_{th} \equiv \frac{W_{out}}{Q_{in}} = 1 - \frac{Q_{out}}{Q_{in}}$$

where $\eta_{th}$ is a dimensionless efficiency factor. This is a performance measure of a device that uses thermal energy, such as an internal combustion engine.

The theoretical maximum efficiency of any heat engine is given by the Carnot theorem, which posits that the theoretical maximum efficiency of any heat engine depends on the difference between hot and cold temperature reservoirs in an ideal thermodynamically reversible engine. This maximum efficiency in a Carnot engine is defined to be:

$$\eta_{th} \leq 1 - \frac{T_C}{T_H}$$

where $T_C$ is the absolute temperature of the cold reservoir, and $T_H$ is the absolute temperature of the hot reservoir. Therefore, efficiency in a Carnot engine is a factor of the temperature gradient between the hot and cold reservoirs.

The Otto cycle is another ideal thermodynamic cycle that relates engine efficiency of internal combustion spark-ignition engines to compression ratio. The geometry of Otto cycle employs two adiabatic and two constant volume processes. Otto cycle efficiency, which assumes perfect gas law behavior, can be expressed as:

$$\eta_{th} = 1 - \frac{1}{r^{\gamma-1}}$$

where r is the volume compression ratio, and $\gamma = C_p/C_v$, the specific heat ratio, of heat capacity at constant pressure ($C_P$) to heat capacity at constant volume ($C_V$). A similar formula for diesel engines relates compression ratio (and combustion expansion ratio) to efficiency in diesel (compression ignition) engines. The specific heat ratio is also known as the "isentropic expansion factor." The specific heat ratio of the air-fuel mixture γ varies with temperature and the heat capacity of the fuel vapor, but is generally close to the air value of 1.4. When using this standard value, the cycle is called an "air-standard cycle." Because γ is always greater than 1, engine efficiency in the Otto cycle is directly related to compression ratio. Therefore, high compression ratio engines will operate more efficiently than a lower compression ratio engine, all other factors being equal.

Temperature control in engines is also an important factor affecting engine efficiency. The Carnot cycle suggests that the higher the temperature after the ignition at top dead center (TDC) of the piston in the cylinder (i.e., the highest temperature in the engine), the larger the temperature differential will be, which leads to greater efficiency. However, real world inefficiencies include the lack of complete mixing of the fuel with air, the rate of combustion, and the air/fuel ratio required for effective ignition. Most engines operate at a near stoichiometric air/fuel ratio. Combustion under these conditions creates excess heat that is not converted into mechanical work. This excess heat must be rejected using a radiator or through the exhaust. The high combustion temperatures created also create undesirable NOx emissions.

Temperature control in modern engines is usually accomplished by a cooling jacket surrounding the engine, transporting heat to a heat exchanger (radiator) that rejects excess heat to the environment and maintains the engine within operating temperature limits. The use of a conventional radiator in such a fashion is termed herein as external cooling. Most modern internal combustion engines are liquid (or water) cooled (externally cooled) using either water or some other liquid coolant, which circulates through the engine and runs through the heat exchanger. Alternatively, some engines are characterized as "air cooled," typically because they lack a radiator. Instead, most air cooled engines have additional fins integral with the engine block or cylinders to convect and radiate heat away from the engine.

Even in the most efficient liquid or air cooled conventional engines, the requirement to shed heat through the cooling system significantly decreases engine efficiency. Approximately 40% of engine heat is dissipated in the radiator or cooling fins, which is lost energy, some part of which could still theoretically be useable as mechanical energy. Thus, reducing this heat loss, and converting excess heat to useful mechanical energy, is an important unmet need in engine design. Conventional automobiles are only about 20% efficient at converting the energy in gasoline to mechanical energy. The remaining 80% or so of the energy in the fuel is lost to the environment through the cooling system and heat exchanger (radiator) and as exhaust heat. Thus, if the heat loss through the radiator (or otherwise dissipated to the environment) could be substantially reduced, engine efficiency could be substantially improved.

The compression ratio in engines which use fuels like gasoline or natural gas is limited by the need to control engine knock, which is caused by pre(auto)-ignition of the fuel prior to the desired ignition from firing of the spark plug. During pre-ignition, fuel ignites during the compression stroke in an uncontrolled fashion due to the high temperatures generated in the cylinder during compression. Such pre-ignition wastes energy and could lead to engine damage if uncontrolled. To avoid engine knock, conventional spark ignition engines are generally limited to an effective compression ratio of about 10:1, with up to 12:1 possible with more expensive high octane fuel.

An additional factor affecting engine performance is the air (oxygen) to fuel ratio. Stoichiometric air provides one mole of molecular oxygen per mole of carbon and 0.5 mole of molecular oxygen per mole of hydrogen in the fuel. The amount of air for true stoichiometric oxygen is dependent on the exact chemical makeup of the fuel, but is approximately 14.7:1 weight/weight (w/w) for gasoline and diesel engines (i.e., 1 gram of fuel to 14.7 grams of air). Engines are typically run rich during cold start and high load operation, but when run rich, there will be non-combusted fuel and thus wasted energy and additional air pollution. Engines normally run most efficiently at about a stoichiometric mixture, but there are theoretical bases for efficient engine operation under lean conditions, of greater than stoichiometric oxygen.

SUMMARY

In one aspect, there is provided a system and method for operating a spark or compression-ignition engine at elevated compression ratios compared to conventional engines, using lean air fuel ratios and liquid water injection to control the temperature inside the cylinder during both the compression and power strokes. The higher compression allows for higher thermal efficiency in accordance with the Otto or compression ignition (diesel) ideal engine cycles, and also allows for reliable ignition of leaner fuel mixtures. The liquid water injection reduces the work during compression by reduction in pressure, controls knock and provides temperature control. The liquid water injection also reduces the need for external cooling leading to less heat loss to the radiator and thus higher efficiency. The combination of liquid water injection and other heat management features, including using very lean air/fuel mixtures, can eliminate totally or substantially reduce the need for a radiator (i.e., a smaller radiator can be employed) than conventional engines, and have substantially lower heat losses to the environment. Engines described herein therefore produce much higher thermal efficiency compared to conventional engines, as well as lower emissions.

According to one embodiment, there is provided an internal combustion engine for use with a hydrocarbon fuel, with at least one cylinder and a reciprocating piston therein, at least one air intake valve providing air into the at least one cylinder, at least one exhaust valve, and a fuel handling system with a fuel injector providing fuel into the at least one cylinder, comprising a water injector coupled to a liquid water source for injecting liquid water (by direct injection) into the cylinder at any time from about 180° to about 30° before TDC during a compression stroke of the piston, wherein the amount of liquid water injected is greater than the amount of water that is present at the saturation point of water vapor in the ambient air in the cylinder. Alternatively, the engine may be provided with an air intake manifold in fluid communication with water or fuel injectors or both, such that the water or fuel or both are port injected into the intake manifold rather than directly into the cylinder. In this port injection embodiment, the water injector will be controlled to inject liquid water at a somewhat earlier time in the cycle, typically from about 300° to about 180° before TDC when the intake valve is still open. The engines have a ratio of air to fuel provided to the at least one cylinder that is greater than stoichiometric.

The engines have an effective compression ratio greater than 13:1. In an embodiment, the engine has an effective compression ratio greater than 15:1. In an embodiment, the compression ratio can be as high as 20:1, or higher. For example, in spark-ignition engines typically operating on gasoline (petrol) ethanol or natural gas, the compression ratio ranges from about 13:1 to about 25:1 and in another embodiment, from about 13:1 to about 20:1. In other embodiments, it is, about 16:1 or about 17:1 or about 18:1 or about 19:1 or about 20:1 or about 21:1 or about 22:1 or about 23:1 or about 24:1 or about 25:1. In diesel fuel engines, in an embodiment the compression ratio may be lower, for example, from about 12:1 or about 13:1, including all of the ranges and values described herein above, but, in addition, in other embodiments it is higher, e.g., it may range up to about 35:1 or higher, for example, about 25:1, or about 26:1 or about 27:1 or about 28:1 or about 29:1 or about 30:1 or about 31:1, or about 32:1, or about 33:1, or about 34:1 or about 35:1.

In an embodiment, when liquid water is directly injected into the cylinder, the injection is timed to occur at from about 180° to about 30° before TDC during a compression stroke of the piston. The internal combustion engine of the present invention includes, in one embodiment, a water injector for direct injection into the cylinder, and in another embodiment water injector for port injection into the cylinder, and in another embodiment two water injectors, one directly into the cylinder and the other through a port. It is to be understood that direct water injection can occur at any time during the cycle from about 180° to about 30° before TDC during a compression stroke of the piston. Moreover the water injection may be at the same or at a different position in the compression stroke of the piston, from cycle to cycle of the compression stroke. For example in one stroke, it may be at position of about 60° before TDC, and in another cycle at about 90° before TDC, the timing and the amount being controlled, as described herein below. In an embodiment, the water injection may range from about 90° to about 60° before TDC, for example, when the water is directly injected into the cylinder.

The above-description is also applicable when the liquid water is port injected. In an embodiment when port injected; however, the liquid water can be port injected at a value outside of 30° to 180° before TDC, such as, for example, at about 300° to about 180° before TDC.

Further in an embodiment, an amount of liquid water injected in an engine cycle ranges at about 1.05 to about 10 times the amount of water vapor carried by air saturated with water vapor at ambient temperature of 25° C. at the engine intake.

Alternately, in another embodiment, an amount of liquid water injected in an engine cycle is about 20% to about 800% w/w of the amount of fuel being injected in the engine cycle. In one embodiment, controls are implemented such that at higher compression ratios, the greater is this % difference. The controls implemented maintain compression end temperature at specified value. As in-cylinder temperature is not measured, the control may be implemented through ambient pressure, temperature, humidity and in-cylinder pressure relative to engine load and engine RPM (rotations per minute).

According to a further aspect, there is provided a method of operating an internal combustion engine for use with a hydrocarbon fuel, the engine having at least one cylinder and a reciprocating piston therein, at least one air intake valve providing air into the at least one cylinder, at least one exhaust valve, and a fuel handling system with a fuel injector providing fuel into the at least one cylinder. The method comprises: injecting liquid water into the cylinder at any time from about 180° to about 30° before TDC of the piston during compression, wherein the amount of liquid water injected is greater than the amount of water that is present at the saturation point of water vapor in the ambient air in the cylinder; wherein a ratio of air to fuel provided to the at least one cylinder is greater than stoichiometric; and, wherein the engine operates at an effective compression ratio of greater than 13:1.

Further to this embodiment, the method includes injecting an amount of liquid water in an engine cycle of about 1.05 to about 10 times an amount of water vapor carried by air saturated with water vapor at ambient temperature of 25° C. at the engine intake.

Further to this embodiment, the method includes injecting an amount of liquid water in an engine cycle of about 20% to about 800% w/w of the amount of fuel in the engine cycle.

As described herein in an embodiment the liquid water is injected into the cylinder any time from about 180° to about 30° before TDC. In another embodiment, water is injected any time from about 45° to about 120° before TDC, and in another embodiment, from about 60° to about 90° before TDC. It is understood that any value or range from about 180° to about 30° before TDC is contemplated, for example, 180°, 179°, 178°, 177°, 176°, 175°, 174°, 173°, 172°, 171°, 170°, 169°, 168°, 167°, 166°, 165°, 164°, 163°, 162°, 161°, 160°, 159°, 158°, 157°, 156°, 155°, 154°, 153°, 152°, 151°, 150°, 149°, 148°, 147°, 146°, 145°, 144°, 143°, 142°, 141°, 140°, 139°, 138°, 137°, 136°, 135°, 134°, 133°, 132°, 131°, 130°, 129°, 128°, 127°, 126°, 125°, 124°, 123°, 122°, 121°, 120°, 119°, 118°, 117°, 116°, 115°, 114°, 113°, 112°, 111°, 110°, 109°, 108°, 107°, 106°, 105°, 104°, 103°, 102°, 101°, 100°, 99°, 98°, 97°, 96°, 95°, 94°, 93°, 92°, 91°, 90°, 89°, 88°, 87°, 86°, 85°, 84°, 83°, 82°, 81°, 80°, 79°, 78°, 77°, 76°, 75°, 74°, 73°, 72°, 71°, 70°, 69°, 68°, 67°, 66°, 65°, 64°, 63°, 62°, 61°, 60°, 59°, 58°, 57°, 56°, 55°, 54°, 53°, 52°, 51°, 50°, 49°, 48°, 47°, 46°, 45°, 44°, 43°, 42°, 41°, 40°, 39°, 38°, 37°, 36°, 35°, 34°, 33°, 32°, 31°, 30°, before TDC.

If the water is port injected, the injection may occur from about 300° to about 180° before TDC. It is understood that any value or range from about 180° to about 300° before TDC is contemplated, for example, 300°, 299°, 298°, 297°, 296°, 295°, 294°, 293°, 292°, 291°, 290°, 289°, 288°, 287°, 286°, 285°, 284°, 283°, 282°, 281°, 280°, 279°, 278°, 277°, 276°, 275°, 274°, 273°, 272°, 271°, 270°, 269°, 268°, 267°, 266°, 265°, 264°, 263°, 262°, 261°, 260°, 259°, 258°, 257°, 256°, 255°, 254°, 253°, 252°, 251°, 250°, 249°. 248°, 247°, 246°, 245°, 244°, 243°, 242°, 241°, 240°, 239°, 238°, 237°, 236°, 235°, 234°, 233°, 232°, 231°, 230°, 229°, 228°, 227°, 226°, 225°, 224°, 223°, 222°, 221°, 220°, 219°, 218°, 217°, 216°, 215°, 214°, 213°, 212°, 211°, 210°, 209°, 208°, 207°, 206°, 205°, 204°, 203°, 202°, 201°, 200°, 199°, 198°, 197°, 196°, 195°, 194°, 193°, 192°, 191°, 190°, 189°, 188°, 187°, 186°, 185°, 184°, 183°, 182°, 181°, or 180° before TDC.

As defined hereinabove, in an embodiment, the amount of liquid water injected ranges from about 1.05 times to about 10 times the amount of water vapor carried by air saturated with water vapor at ambient temperature of 25° C. at the engine intake. Thus for example, in various embodiments, the amount of water injected may be at any values in the range described hereinabove or may range from about 1.05 to about 10 times the amount of water vapor carried by air saturated by water vapor at ambient temperature at the engine intake such as, for example, 1.25, 1.50, 1.75, 2.00, 2.25, 2.50, 2.75, 3.00, 3.25, 3.50, 3.75, 4.00, 4.25, 4.50, 4.75, 5.00, 5.25, 5.50, 5.75, 6.00, 6.25, 6.50, 6.75, 7.00, 7.25, 7.50, 7.75, 8.00, 8.25, 8.50, 8.75, 9.00, 9.25, 9.50, 9.75, or 10.00. times the amount of water vapor carried by air saturated by water vapor at ambient temperature of 25° C. at the engine intake.

In alternative embodiment, the amount of water injected ranges from about 20% to about 800% w/w of the fuel. Any range or value from about 20% to about 800° w/w fuel can be utilized, e.g., 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, 500%, 505%, 510%, 515%, 520%, 525%, 530%, 535%, 540%, 545%, 550%, 555%, 560%, 565%, 570%, 575%, 580%, 585%, 590%, 595%, 600%, 605%, 610%, 615%, 620%, 625%, 630%, 635%, 640%, 645%, 650%, 655%, 660%, 665%, 670%, 675%, 680%, 685%, 690%, 695%, 700%, 705%, 710%, 715%, 720%, 725%, 730%, 735%, 740%, 745%, 750%, 755%, 760%, 765%, 770%, 775%, 780%, 785%, 790%, 795%, or 800%.

In another embodiment, the amount of water injected range from about 40% to about 400% (w/w) of the amount of fuel being injected in the engine cylinder.

In another embodiment, the amount of water injected range from about 50% to about 300% (w/w) of the amount of fuel being injected in the engine cylinder.

In still another embodiment, the amount ranges from about 60% to about 200% (w/w) of the amount of fuel being injected in the engine cylinder.

The loss of dissipated heat in the internal combustion engine is minimized by utilizing water injection in which the amount of liquid water injected is greater that in conventional combustion engines.

BRIEF DESCRIPTION OF THE DRAWINGS

The objects, features and advantages will become apparent to one ordinary skill in the art, in view of the following detailed description taken in combination with the attached drawings, in which FIG. 1A show a cutaway view of the configuration and liquid water spray pattern of the liquid water injector in an example cylinder in one embodiment.

FIG. 2 depicts a matrix 500 describing the alternative combinations of internal combustion engine configurations for providing liquid water injection and heat management features as described herein;

DETAILED DESCRIPTION

This disclosure provides two-stroke or four-stroke, or higher stroke combustion engines with at least one cylinder employing direct liquid water cylinder injection and/or port injection features to regulate the temperature of the combustion process, as the combustion is in progress. The engine may thus include a spark plug, or a glow plug, a plasma igniter, or a laser igniter providing for spark ignition, plasma ignition, pilot ignition, laser ignition, free radical ignition or spark assist compression ignition and operate with gasoline (petrol), alcohol or combination thereof or natural gas as fuel. Alternatively, the engine may employ compression ignition, such as a diesel (kerosene) powered engine with or without additional assistance of spark, plasma or laser.

Figure 3:
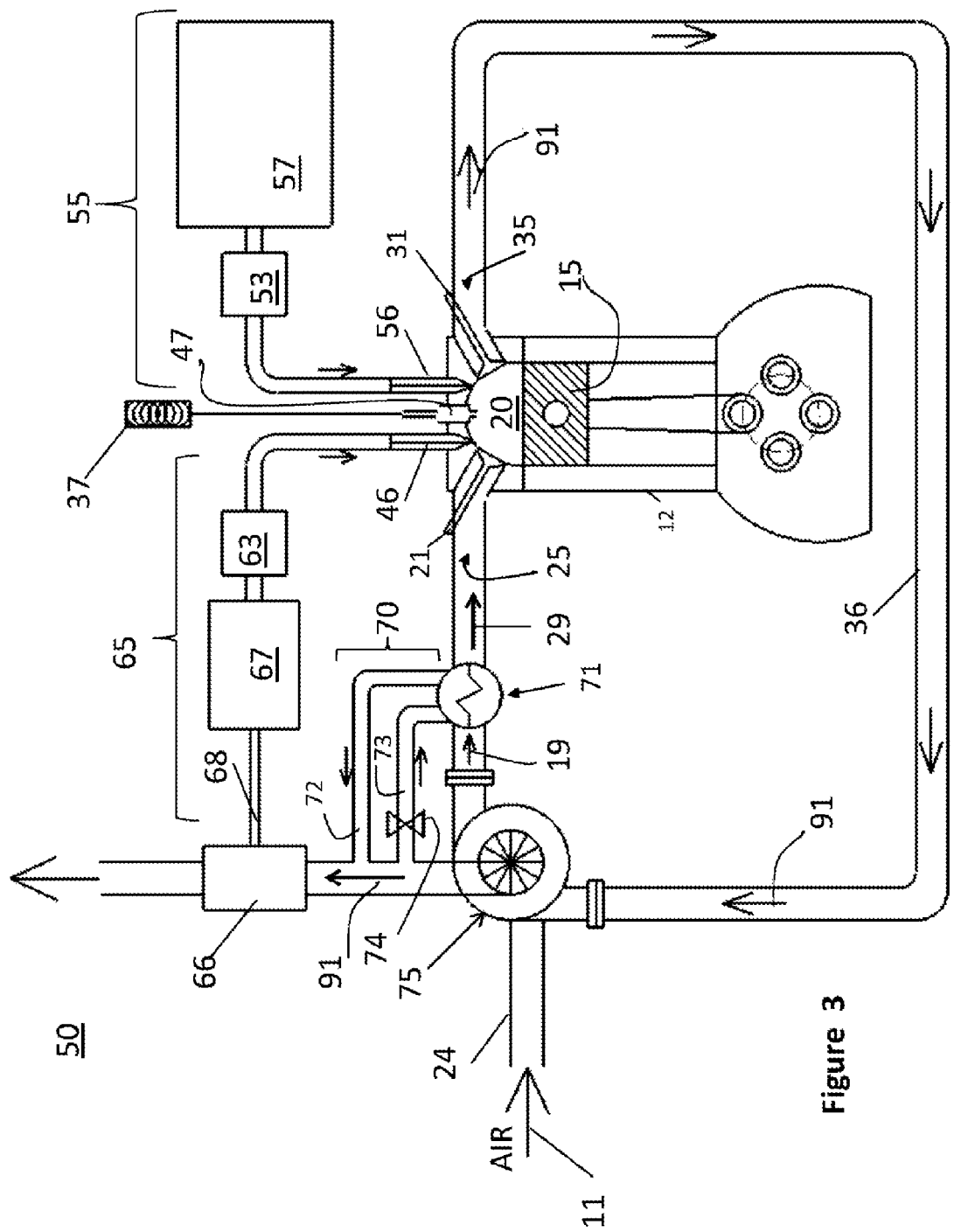
FIG. 3 depicts an example configuration of an internal combustion engine 50 of a first embodiment having liquid water injection features as described herein.
Figure 4:
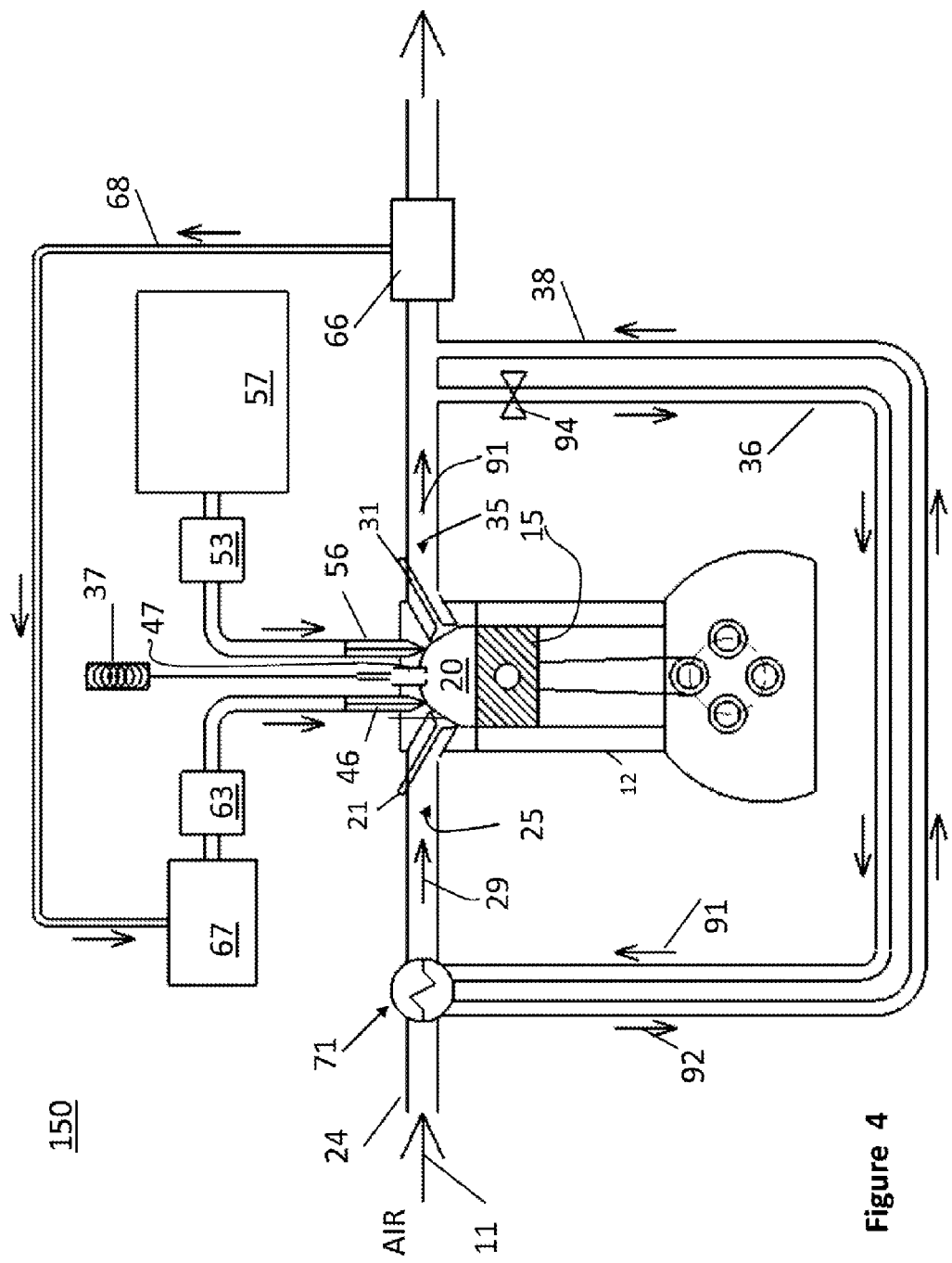
FIG. 4 depicts an example configuration of an internal combustion engine 150 of a second alternative embodiment having liquid water injection features as described herein.
Figure 5:
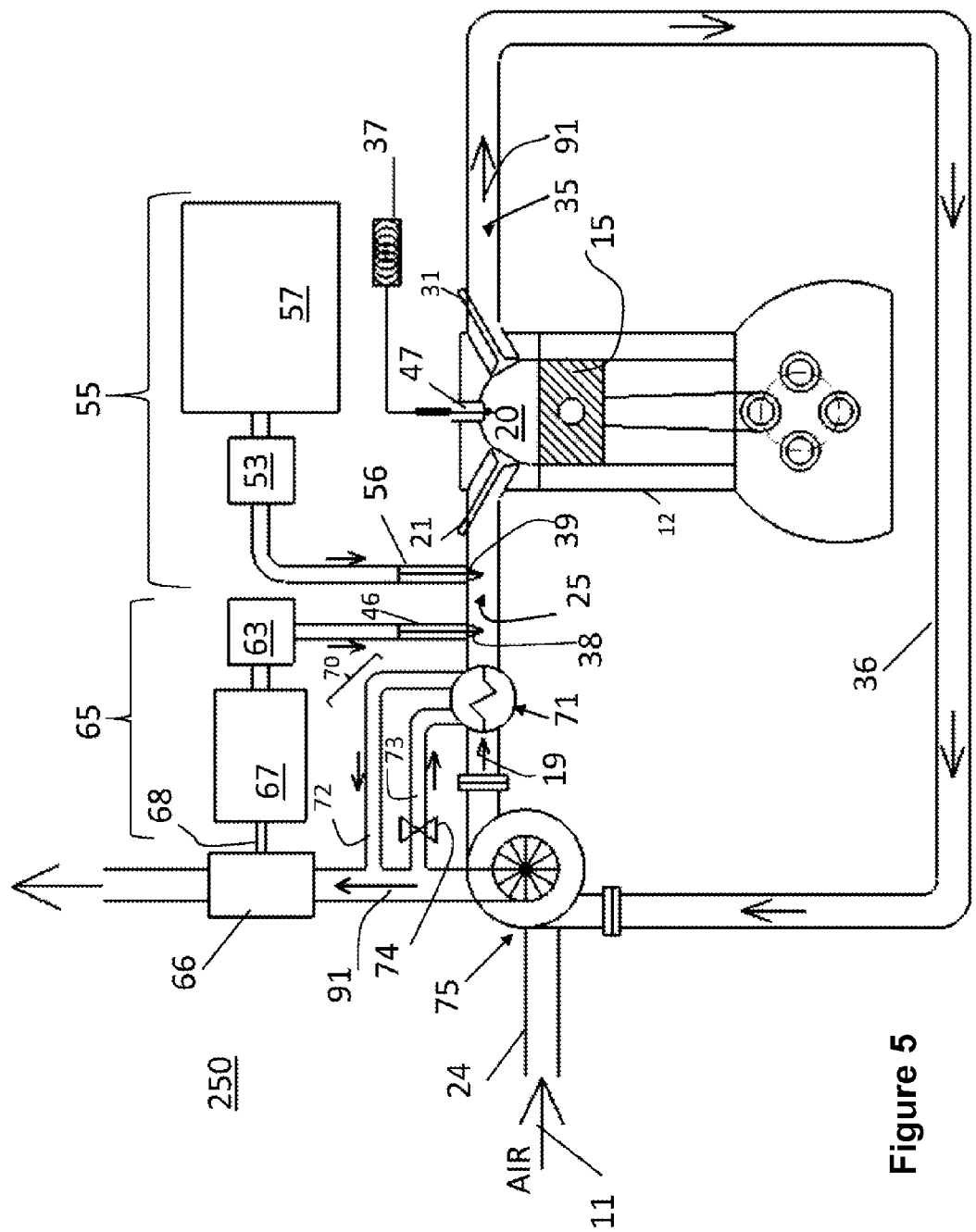
FIG. 5 depicts an example configuration of an internal combustion engine 250 of a third alternative embodiment having liquid water injection features as described herein.
Figure 6:
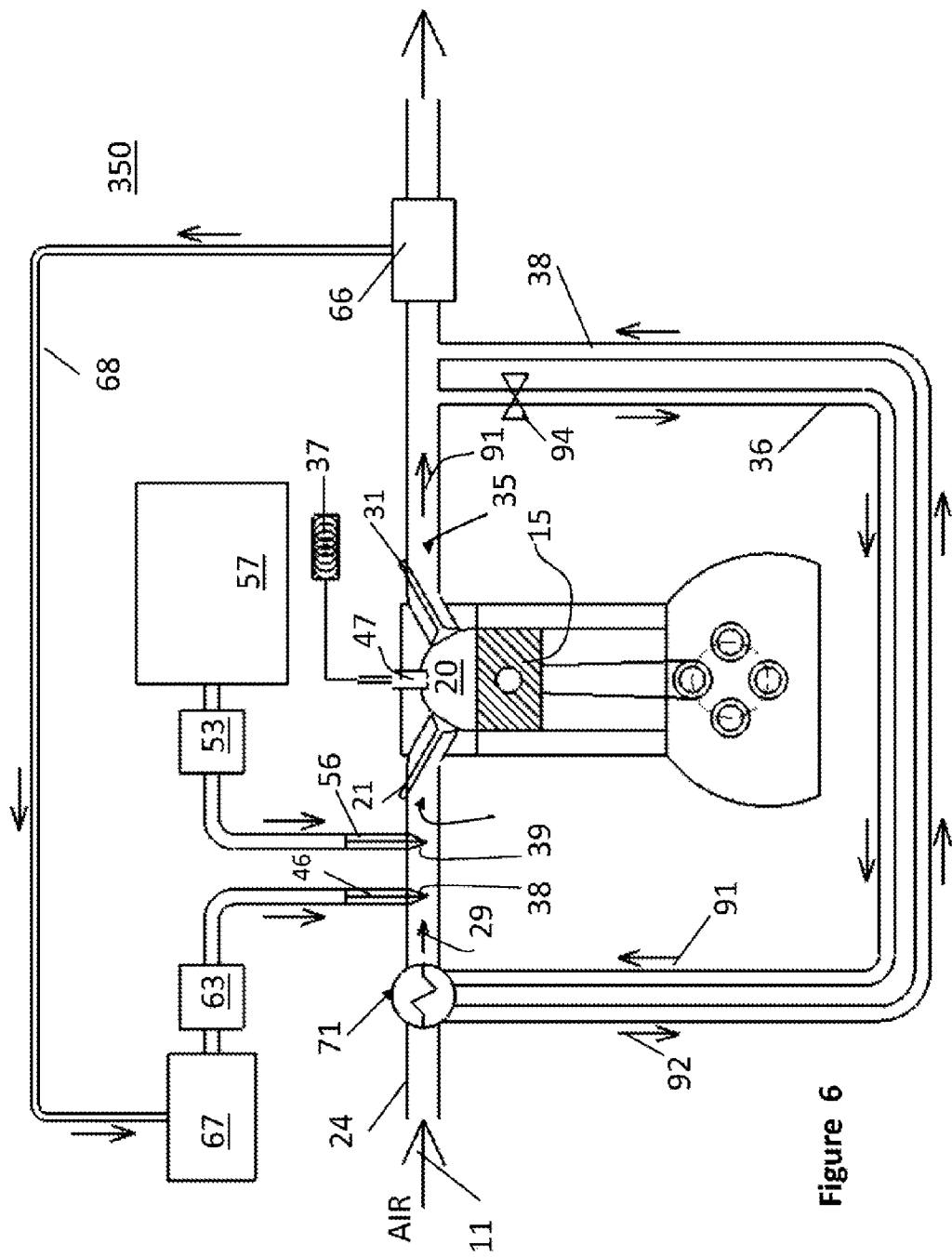
FIG. 6 depicts an example configuration of an internal combustion engine 350 of a fourth alternative embodiment having liquid water injection features as described herein.
Figure 7:
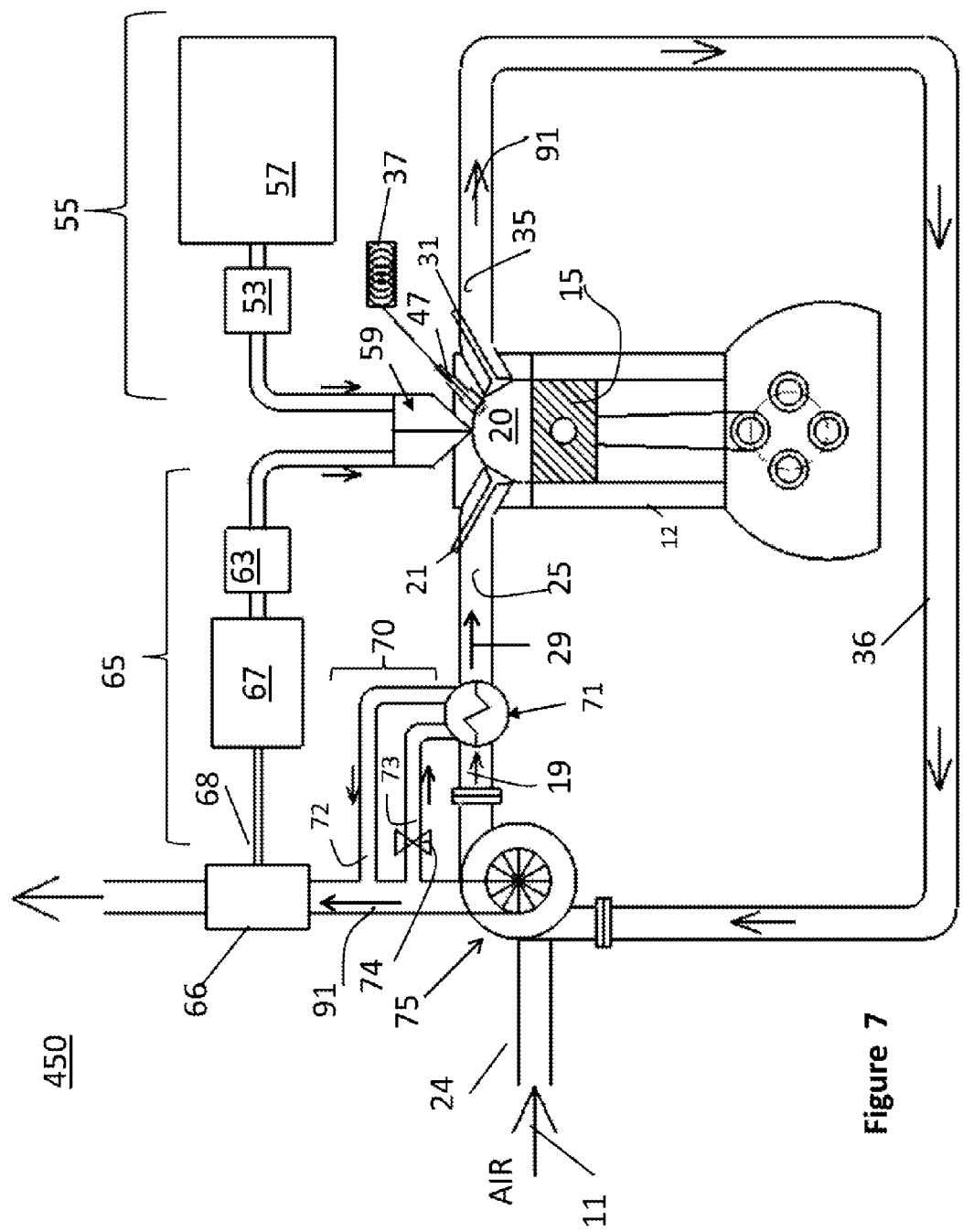
FIG. 7 depicts an example configuration of an internal combustion engine 450 of a fourth alternative embodiment having liquid water injection features as described herein.

FIG. 2 shows a matrix 500 of various embodiments of an internal combustion engine including direct liquid water injection features and other heat management techniques described herein. For example, each of sixteen (16) combinations 502 show various engine configurations with marks (e.g., an "X") indicating: a combustion engine 505 e.g., spark ignition engines (or alternatively, by omission of an "X" mark, indicates a compression type engine); presence of a turbocharger element 508 (indicating use of a turbocharger device); implementation of a direct liquid water injection in the cylinder 512 or liquid water injection at the inlet port 522 (e.g., by suction); implementation of direct fuel injection in the cylinder 515 or fuel injection at the inlet port 525. Column 510 shows exemplary embodiments described herein. For example, as will be described in greater detail, FIG. 3 shows an engine combination of a first embodiment indicated as 50, FIG. 4 shows an engine combination of an alternative embodiment indicated as 150, FIG. 5 shows an engine combination of an alternative embodiment indicated as 250, FIG. 6 shows an engine combination of an alternative embodiment indicated as 350, and FIG. 7 shows an engine combination of an alternative embodiment indicated as 450. Like reference numbers in the various views indicate like elements.

FIGS. 3-7 illustrate some of the embodiments described in FIG. 2. However, contemplated within the scope of the present disclosure are engines comprised of direct water and direct fuel injection, alone or in combination with port water or port fuel injectors, in either a spark-ignited engine or diesel engine. By the term "direct injection" is meant that the fuel or water being injected is injected directly into the cylinder. In the case of direct fuel injection, the fuel is injected without premixing with air. By the term "port injection" is meant that the fuel or water are injected into an intake manifold, where premixing with air occurs prior to the air/vapor/water mix entering the cylinder. In some embodiments, the engine, whether spark-ignited or diesel, is turbocharged or supercharged. Also contemplated are engines comprised of direct water injection or direct fuel injection or both and/or alternatively port water or port fuel injection, or both, or any combination thereof as long as the engine has at least one means for injecting water and injecting fuel.

Referring to FIG. 3, the internal combustion engine 50 of a first embodiment includes a fuel injection system 55 including a fuel reservoir 57 providing fuel to a fuel pump 53 which supplies fuel via fluid conduit or like transport means to a fuel injector device 56 mounted to the cylinder head portion 20 to provide fuel under controlled conditions of temperature and pressure for combustion in the cylinder 12. Fuel injector 56 injects fuel directly into the cylinder without premixing with air. The fuel injection system can include a means for controlling the timing of fuel injection. Under timed computer control, the fuel can be charged into the cylinder.

In FIG. 3, the internal combustion engine 50 of a first embodiment includes a liquid water injection system 65 including a liquid water reservoir 67 providing water to a water pump 63 which supplies liquid water via a fluid conduit or liquid transport device to a liquid water injector device 46 mounted to the cylinder head portion 20 to provide direct liquid water injection under controlled conditions of timing, pressure (e.g. variable or constant pressure) into the cylinder 12. Injector 46 as embodied in FIG. 3 injects water directly into the cylinder. The control system described below may control the injection of liquid water into the cylinder 12 at one or more timed instances, every compression cycle. As shown in FIG. 3, an ignition coil 37 controls firing of spark plug 47, mounted, in one embodiment, near the center of the cylinder head portion, situated between the liquid water injector 46 and the fuel injector device 56 mounted in the cylinder head portion 20.

In the embodiment of FIG. 3, in communication with cylinder head portion 20 is an engine intake valve 21 timely actuated at each cycle to provide air from an intake manifold 25 for combustion with fuel within cylinder head portion 20. Likewise, in communication with the cylinder head portion 20 is an exhaust valve 31 timely actuated at each cycle to enable exhaust gas products from combustion (carbon dioxide, air or any other emissions) to exit the cylinder to an exhaust manifold 35, where, in one embodiment, is captured to perform further work for the engine, e.g., heated air.

In a further embodiment, shown in FIG. 3, a turbocharger sub-system 75 is provided at air input, e.g., a manifold inlet 24, for receiving both the input ambient air 11, and receiving from exhaust manifold portion 36 hot exhaust gases 91 from the products of combustion to form a turbocharged compressed air mixture for combustion. In an alternative embodiment, a supercharger may be used instead. In either case, the turbocharger or supercharger is controllable to adjust the amount of air forced into the cylinder or intake manifold.

As shown in the embodiment of engine 50 in FIG. 3, there is provided a structure and methodology of recapturing the heat byproduct of internal combustion engines that can be used to further heat the air or fuel or liquid water at the cylinder. For example, the turbo-compressed air mixture 19 at the output of the turbocharger 75 is subject to heat regulation, e.g., heat removal via heat exchanging sub-system 70 that includes a heat exchange device 71 for recapturing a substantial portion of the waste heat produced by combustion and converting it into useful energy. In one aspect, heated exhaust gases 91 are re-circulated from the exhaust manifold 35 via manifold extension 36 for input to the turbocharger element 75 and input to heat exchanger 71 for use in pre-heating the liquid water to be injected and/or for use in pre-heating the air/fuel to be injected. As shown in FIG. 3, heat energy from the re-circulated exhaust air 91 is controllably added under control of valve 74, e.g., via conduit 73 to the heat exchanger 71 to thereby regulate temperature of intake air 29 provided to the cylinder head portion 20 for combustion. Further heated gas exhaust is removed via heat exchanger 71, e.g., via conduit 72. The controllably removed heat from the exhaust gases 91 may be used to pre-heat the liquid water in water reservoir 67.

Further, in the embodiment of the engine 50 of FIG. 3, there is a water recovery unit 66, i.e., a unit that extracts water from the exhaust gas for example by cooling the exhaust down to ambient temperature by conventional means, e.g., condenser or by the by use of nanopore membranes in which the water is condensed from the exhaust stream through capillary action, and the like. Thus, for example, in an embodiment, a condenser is provided that will capture water from any water vapor by-product from the exhaust gas 91 which water may input via a fluid conduit or coupling 68 to the water reservoir 67. The use of a water recovery device 66 as described herein also serves the purpose of reducing the water storage requirements for the engines. This may be particularly important in, for example, automotive applications, where the amount of water that would be required on board the vehicle could be substantial absent means to capture and recycle water in the exhaust stream.

A further embodiment is shown in FIG. 4 which depicts a non-turbocharged engine 150 of an alternative embodiment that implements direct liquid water and direct fuel injection into the cylinder head portion 20 via respective injectors 46, 56. In the embodiment depicted in FIG. 4, ambient air 11 is input to a heat exchanger device 71 via inlet 24 and hot exhaust gases 91 are circulated to the heat exchanger device 71 under control of valve device 94. The heat from the hot exhaust gases is used to pre-heat the air 29 that is input to the cylinder for combustion. Cooled gases 92 are re-circulated back to the output exhaust manifold 35 via exhaust manifold portion 36 for engine output. A water recovery unit 66 as defined herein is provided to capture liquid water from any water vapor present in the exhaust gas 91 which water may input via a fluid conduit or coupling 68 to the water reservoir 67.

In another embodiment, FIG. 5 depicts a turbocharged or supercharged engine 250 that implements port liquid water injecting and port fuel injection via respective injectors 46, 56 into respective ports 38, 39 formed at the intake manifold 25 associated with the cylinder 12. That is, respective liquid water supply system 65 provides water under controlled timing and (variable or constant) pressure conditions to port liquid water injector 46 at the port of intake manifold 25 near the intake valve 21 under control system operation. Likewise, fuel supply system 55 provides fuel under timed control and pressure conditions to the fuel injector 56 at the port near the intake valve of intake manifold 25. Otherwise, the embodiment of FIG. 5 is similar to engine 50 depicted in FIG. 3. For example, engine 250 in FIG. 5, also provides for the recapturing the heated gaseous product of combustion that can be used to further heat the air or fuel or liquid water at the cylinder. For example, the turbo-compressed air mixture 19 at the output of the turbocharger 75 is subject to heat regulation, e.g., heat removal via heat exchanging sub-system 70 that includes a heat exchange device 71 for capturing a substantial portion of the waste heat produced by combustion and converting it into useful energy to control pre-heating of the air/fuel and water. In one aspect, the heated exhaust gas 91 is re-circulated from the exhaust manifold 35 via manifold portion 36 for input to the turbo charger element 75 and input to heat exchanger 71 for use in pre-heating the liquid water to be injected and/or for use in pre-heating the air/fuel to be injected. As shown in FIG. 5, heat energy from the re-circulated exhaust air 91 is controllably added under control of valve 74, e.g., via conduit 73 to the heat exchanger 71 to thereby regulate temperature of intake air 29 provided to the cylinder head portion 20 for combustion. Further heated gas exhaust is removed via heat exchanger 71, e.g., via conduit 72. The controllably removed heat from the exhaust gases 91 may be used to pre-heat the liquid water in water reservoir 67. Further, in the embodiment of the engine 250 of FIG. 5, a water recovery unit 66 is provided that will capture water from any water vapor product from the exhaust gas 91 which water may input via a fluid conduit or coupling 68 to the water reservoir 67.

A further embodiment is shown in FIG. 6 which depicts an engine 350 that implements port liquid water injecting and port fuel injection via respective injectors 46, 56 into respective ports 38, 39 formed at the intake manifold 25 associated with the cylinder 12. Otherwise, the embodiment of FIG. 6 is similar to engine 150 depicted in FIG. 4, wherein ambient air 11 is input to a heat exchanger device 71 via inlet 24 and hot exhaust gases 91 are circulated back to the heat exchanger device 71 under control of valve device 94. The heat from the hot exhaust gases is used to pre-heat the air 29 that is input to the cylinder for combustion. Cooled gases 92 are re-circulated back to the output exhaust manifold 35 via exhaust manifold portion 36 for engine output. A water recovery unit 66 as described herein is provided to capture liquid water from any water vapor present in the exhaust gas 91 which water may input via a fluid conduit or coupling 68 to the water reservoir 67.

In the engine 450 of FIG. 7, a dual liquid water and fuel injector 59 is implemented for directly injecting both fuel and liquid water into the cylinder head portion for combustion. That is, instead of feeding separate respective liquid water and fuel injectors, liquid water injection system 65 and a fuel injection system 55 feed the combined liquid water and fuel injector 59. Otherwise, the embodiment of FIG. 7 is similar to engine 50 depicted in FIG. 3. For example, engine 450 in FIG. 7 also provides for recapturing the heated gaseous product of combustion that can be used to further heat the air or fuel or liquid water at the cylinder. For example, the turbo-compressed air mixture 19 at the output of the turbocharger 75 is subject to heat regulation, e.g., heat removal via heat exchanging sub-system 70 that includes a heat exchange device 71 for capturing a substantial portion of the waste heat produced by combustion and converting it into useful energy to control pre-heating of the air/fuel and water. In one aspect, the heated exhaust gas 91 is re-circulated from the exhaust manifold 35 via manifold portion 36 for input to the turbo charger element 75, and input to heat exchanger 71 for use in pre-heating the liquid water to be injected and/or for use in pre-heating the air/fuel to be injected. As shown in FIG. 7, heat energy from the re-circulated exhaust air 91 is controllably added under valve 74 control, e.g., via conduit 73 to the heat exchanger 71 to thereby regulate temperature of intake air 29 provided to the cylinder head portion 20 for combustion. Further heated gas exhaust is removed via heat exchanger 71, e.g., via conduit 72. The controllably removed heat from the exhaust gases 91 may be used to pre-heat the liquid water in water reservoir 67. Further, in the embodiment of the engine 450 of FIG. 7, a water recovery unit 66 as described herein and the like is provided that will capture water from any water vapor product from the exhaust gas 91 which water may input via a fluid conduit or coupling 68 to the water reservoir 67.

Referring to matrix 500 of FIG. 2, further embodiments of the combustion engines depicted in FIGS. 3-7 contemplate direct liquid water injection at both the cylinder head portion 20 and at port 38 of the intake manifold 25 at one or more timed instances during the compression stroke to effectively reduce air temperature and increase density and hence air mass flow rate and power.

Figure 1B:
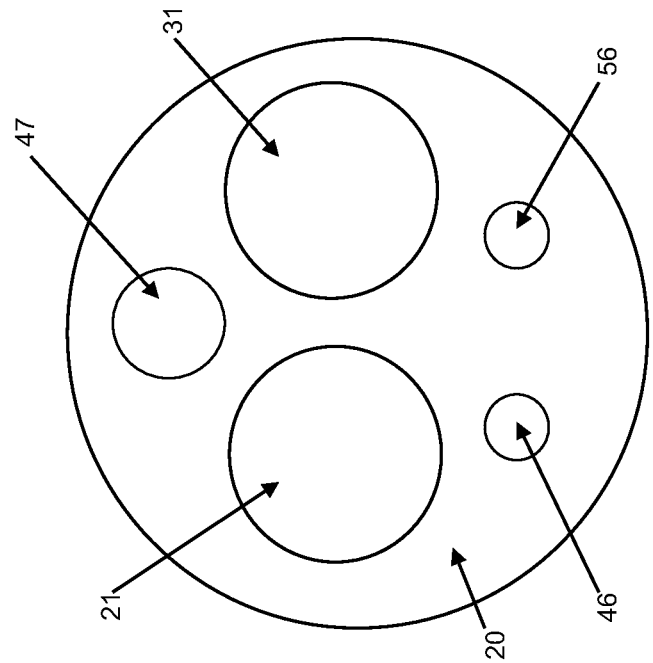
FIG. 1B is an underside view of the cylinder head or chamber taken along line A-A of FIG. 1A.
Figure 1A:
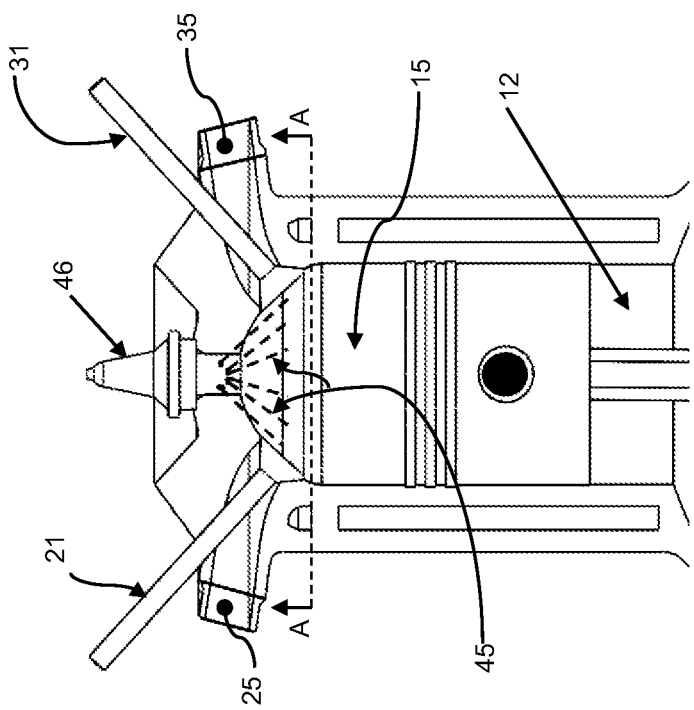

FIGS. 1A and 1B depict a direct liquid water injection operation 10 in a cylinder with a reciprocating piston shown near TDC employed in the engines 50, 150, 450, for example, of respective FIGS. 3, 4 and 7. As depicted in FIG. 1A, the cylinder 12 is shown with a reciprocating piston 15 at or near TDC in cylinder 12. In communication with cylinder head portion 20 is an intake valve 21 timely actuated at each cycle to provide air from an intake manifold 25 for combustion within cylinder head portion 20. Likewise, in communication with the cylinder head portion 20 is an exhaust valve 31 timely actuated at each cycle to enable exhaust gas products from combustion (carbon dioxide, air or any other emissions) to exit the cylinder to an exhaust manifold 35, where it may exit the vehicle as exhaust or, is captured to perform further work for the engine, e.g., heat up air, fuel, and liquid water. Further shown in FIG. 1A are embodiments of streams of water 45 exiting direct water injector 46, showing the streams impacting interior surfaces of the cylinder, which may include parts of the engine head, valves, cylinder walls, or the piston face. In other embodiments, the water outflow from the water injector may be directed in other specific directions or may be a fine atomized spray that will have minimal impact with interior surfaces of the cylinder or cylinder head.

The engines of the matrix 500 of FIG. 2 and shown in particular embodiments of FIGS. 3-7 operate at higher compression ratios than conventional engines. In one embodiment, the "effective" compression ratio of the engines is greater than 13:1, and may be as high as 40:1 without the use of any turbocharging, or like techniques that seek to boost compression. Thus, for example, the effective compression ratio of the engines described herein are determinable based on an inlet air pressure of being about 1 atm., or less, without use of additional compression such as provided by turbocharging.

The engines of the matrix 500 of FIG. 2 and shown in particular embodiments of FIGS. 3-7 employ liquid water injection prior to ignition. The injected liquid water cools the air charge during the compression stroke, reducing compression work and absorbing heat that would otherwise be lost to the environment. The effect of the liquid water added during compression and lean fuel mixtures permits the engine operation at much higher than conventional compression ratios without knock.

Further, in the engines of the matrix 500 of FIG. 2 and shown in particular embodiments of FIGS. 3-7, one or more of the fuel, air, or liquid water may be controllably heated prior to injection, e.g., by employing a heat exchanger with the exhaust. The liquid water may be heated, which affects the vapor equilibrium of the liquid water, the degree of cooling effected by the liquid water, and the rapidity of steam formation. In one embodiment, the liquid water may be heated to at a temperature of 25° C. or heated up to a temperature of about 80° C. prior to injection. Alternatively, the liquid water is heated such that the temperature of the injected water is greater than about 40° C., or a temperature greater that about 50° C., or a temperature greater that about 60° C. or, a temperature greater than about 80° C. or higher. Depending upon the pressure of the injected liquid water, it can be heated to even higher temperatures, within a few degrees less than the corresponding saturation temperature. For example, for pressures of 10, 30, or 50 bar the injected liquid water temperature could be about 150° C., 200° C., or 250° C. respectively.

The sum of these features results in engines 50, 150, 250, 350, 450, of FIGS. 3-7 running at much higher thermodynamic efficiency than conventional engines. As a result, the radiator will be much smaller than is required in conventional engines or not even necessary at all, because the features of the inventive engine manage excess heat much better than conventional engines, and minimize unnecessary heat losses to the environment. With this combination of factors, a transformational change occurs in both specific power and fuel economy for a given displacement and RPM.

Further, in the engines of the matrix 500 of FIG. 2 and shown in particular embodiments of FIGS. 3-7, respective fuel injectors 56 are controlled to provide fuel at a ratio of air to fuel that is greater than stoichiometric, with a water injector that injects liquid water at one or more instances into the cylinder at any time ranging from about 180° to about 30° before TDC during compression, and wherein the amount of liquid water injected is greater than amount of water at the saturation point of water vapor in the ambient air in the cylinder; and wherein the engine has an effective compression ratio greater than 13:1.

In one embodiment, the amount of water to be injected per cycle is controlled in relation to inlet pressure, temperature, relative humidity and current engine operating parameters as compression end pressure, load and rpm. The microcontroller described below with respect to FIG. 8, may have necessary data/functions stored as look-up tables and can compute the water quantity in relation to the sensed input parameters. For example, an amount of liquid water (saturation vapor mass) can be approximately computed by using ideal gas laws and available air saturation steam table for injection per cycle. For example, in the control system described herein, an amount of liquid to be injected for current cylinder compression cycle may be determined based on a current value of the ambient temperature, e.g., temperature sensed at the intake manifold or inlet air temperature at the intake valve at the cylinder, and/or from tabulated humidity/climate data, from which the saturation point of water vapor at the sensed temperature is determinable. The control system adds an additional amount of water (by weight or volume) that will be greater than the minimum amount necessary to completely saturate the air at the sensed inlet air at temperature.

Water Injection

One factor allowing for greater compression in each of the engine embodiments is internal cooling during the compression cycle by the addition of liquid water in the engine's cylinder(s) during the compression stroke. Injecting liquid water into the engine cylinder performs several important functions. The liquid water internally cools the interior of the cylinder during compression by absorbing the heat produced during the compression. This internal cooling has the effect of reducing the work required for compression, and also has the effect of allowing greater compression ratios without engine knock.

The amount of liquid water injected into the engine cylinder during a compression cycle is a function of the saturated water vapor capacity of ambient air, or a function of fuel on a weight basis. In an embodiment, the amount of liquid water injected per cycle is greater than the amount that is required to saturate air at 20° C. Alternatively, the amount of liquid water injected per cycle may be about 1.05 to about 10 times the amount of water vapor carried in ambient air in the engine inlet. Alternatively, the amount of liquid water may range from about 20% to about 800% w/w of the amount of fuel injected per compression stroke. The amount of liquid water injected may be metered to optimize internal cooling, minimization of work required during compression, minimization of engine knock, and to provide or prevent liquid water droplets mixed with gases at the moment of ignition. The control of the liquid water injection may be based on pressure and temperature sensors in the engine that are coupled to a computer control system that controls the water injection system as described below with respect to FIGS. 8 and 9.

A direct liquid water injector 46 may inject liquid water into the cylinder as a liquid droplet stream, either continuously, intermittently, or as a pulsed stream. In another embodiment, the liquid water may be injected as a "coarse" spray or an atomized flow. In another embodiment, the liquid water may be injected as a stream directed to cool internal surfaces of the cylinder head and piston top. In yet another embodiment, the liquid water is port injected as an atomized spray into the intake manifold. Any combination of these embodiments may be used and other embodiments of injecting liquid water are also possible and within the scope of this concept. In one aspect, the size of liquid droplets will determine rate of heat transfer as the interface area will increase with decrease in droplet size. The size of the droplets is controlled by the liquid water injector settings (and other factors such as timing and metering) and will be controlled according to the required rate of heat absorption (evaporation) as dictated by compression temperature rise (sensed through pressure). In one embodiment, the smaller the required rate of heat absorption, the coarser (less atomized) could be the injected water spray. In one embodiment, the size of the average liquid water droplets are spherical-like in a "fine" size ranges from about 0.5 µm to about 25 µm in diameter while the size of the average liquid water droplets in a "coarse" size range may be from about 25 µm to about 100 µm.

In several of the engine embodiments, at least a portion of the liquid water is injected into the cylinder (by a water injection direct in the cylinder or in the air intake) during the first part of the compression stroke, between about bottom dead center (BDC) (i.e., about 180° before TDC) and about 30° before TDC. The presence of liquid water during the compression stroke will reduce the work required in the compression stroke, as the liquid water will absorb latent heat from hot air during compression and thus reduce its temperature. The enthalpy of vaporization, (Δvap) of water at standard pressure is about 40.7 kJ/mol, equivalent to about 2250 J/g. This is the energy required to convert liquid water to steam. The enthalpy of vaporization of liquid water depends on pressure and reduces to zero at the critical point, 374.4° C. at 22242 kPa (about 222 bar). For pressures of 10, 30, 50, or 100 bar, the enthalpy of vaporization is about 2015, 1796, 1640, or 1317 J/g respectively, which is still substantial. As pressure is related to temperature, the pressure will be proportionally reduced in spite of small increases in mass and the gas constant R. The reduction in pressure during compression will therefore reduce the work necessary to achieve compression. The work required for compression depends only on pressure as a given volume is fixed ($\delta W = P \cdot dV$), where W is the work, P is Pressure, and dV is volume differential.

Another effect of added liquid water during the compression stroke is to reduce or eliminate the need for external jacket cooling. The need for external cooling arises due to very high gas temperatures and inevitable heat transfer to internal surfaces in the cylinder, particularly the cylinder head, but also the piston face. The injected liquid water may form droplets in the cylinder that cools the gases in the cylinder during compression.

Alternatively, liquid water injection may be configured to spray and cool internal surfaces of the engine (cylinder head and piston head) rather than directly cool the gases in the cylinder. In one embodiment, the fuel is expected to be injected predominantly in radial direction and water predominantly in axial direction such that these may not interfere substantially. An embodiment of this concept is shown in FIG. 1A illustrating the centrally mounted liquid water injector 46 on cylinder head 20. The injector is timely actuated under programmed logic or microprocessor control to direct a water droplet stream(s) (e.g., a continuous stream, an intermittent or atomized spray) of liquid water in the cylinder head. Representative streams of water are shown as dashed lines 45 in FIG. 1A. As further shown in FIG. 1B, depicting a cylinder in an engine having an intake valve 21 and an exhaust valve 31, such a liquid water injector 46 may be mounted offset from center. Also shown in FIG. 1B is sparkplug 47 and fuel injector 56. In the embodiment of FIG. 1A, the injector may be actuated to provide a metered volume of liquid water spray comprising a pattern of one or more individual liquid water droplet streams 45, aimed at one or more directions and individually timed to inject water within cylinder head portion 20, or at the piston head at various times during compression.

In operation, some of the liquid water injected may remain unevaporated as liquid droplets mixed with other gases in the cylinder at the moment of ignition. This liquid water converts to steam after the ignition. Thus, there is provided a higher density medium before the ignition and substantially greater expansion of the water droplets leading to higher efficiency. This embodiment is based on the principle that liquid water expands in volume about 1600-fold when converted to steam (at 100° C. at standard pressure). Furthermore, the vaporization of liquid water during combustion will provide a denser medium and enhanced expansion pressure, from the greater volumetric expansion of water to steam as compared to other gases in the cylinder during combustion. This embodiment may also allow for cooler exhaust gases due to the high latent heat of vaporization (enthalpy of vaporization) water. In this case, less heat would need to be rejected to keep the engine temperature within its operating limits.

In an alternative embodiment, whether directly input to the port or cylinder, the amount of liquid water added during the compression stroke is metered to minimize the presence of liquid water when combustion is initiated. This addresses the concern that liquid water present at the beginning of ignition will absorb heat from the combustion gases, reducing both temperature and pressure in the power stroke, for the same reasons that the work required during compression will be reduced when liquid water is present—pressure and temperature are reduced from the latent heat of vaporization as liquid water is vaporized.

In another embodiment, whether directly input to the port or cylinder, the metered amount of liquid water may be injected into the cylinder at a time ranging from about 180 to about 30 degrees before TDC. In the embodiment shown in FIG. 1A, the liquid is intentionally directed to the piston face and cylinder head and intake and exhaust valve heads, to avoid having the water well mixed with the fuel charge within the cylinder. This embodiment is illustrated in FIG. 1A showing several coarse liquid water streams of the spray pattern 45 that do not mix well with the fuel charge (fuel/air mixture). This embodiment addresses the concern that any liquid water present during combustion will reduce pressure and temperature during the power stroke. This embodiment solves the problem of using liquid water injected strategically to cool the engine, while at the same time minimizing the likelihood the liquid water will cool the combustion process and reduce the power output of the engine. During compression the addition of liquid water to absorb heat from hot air would be optimal if the liquid water was injected into the cylinder and thoroughly mixed with the gases in the cylinder. But during the late part of compression stroke and early part of the power stroke, near TDC, the cylinder volume and cylinder wall area is very small as compared to the combined areas of the piston face and cylinder head, including valves. By injecting liquid water during late part of compression stroke that is directed to the cylinder head or piston surfaces, and avoiding mixing of liquid water with hot gases, substantial cooling of the engine can be achieved without cooling the combustion process post-ignition. This method may be able to capture almost all the heat internally that was going to the coolant and the radiator. Furthermore, it is well known that the cylinder head is a very hot portion of any internal combustion engine. The heat absorbed by liquid water internally in this embodiment can be regarded as stored in buffer to be recovered in the exhaust to heat injected water, fuel and if required, inspired air.

In a further embodiment, the engines employ a mixture of liquid water with an alcohol, or other additives that are commonly added to water in engines to lower the freezing point of liquid water, such as, e.g., methanol, ethanol, isopropanol. The use of such an alcohol additive prevents the liquid from freezing in cold weather, which is an important consideration in for example, automotive applications in cold climates. The liquid water-alcohol mixture ratio may range from about 0% to about 50% by weight. As used herein, with respect to the water-alcohol mixture ratio, it is understood that ranging from about 0% means that an amount of alcohol (or like additive) is present.

Lean Fuel Mixture

In combination with various embodiments of the engines as described herein is the use of lean air/fuel mixtures. That is, the fuel is injected either into the inlet air stream or injected directly into the cylinder with a fuel injector. The amount of fuel is adjusted to keep the air/fuel mixture lean. This means that a molar excess of oxygen, in air, is employed in the engines. Stoichiometric air to gasoline fuel is approximately 14.7:1 (w/w). The ratio of actual amount of air to stoichiometric air for the injected fuel is expressed as $\lambda$ (i.e., the relative air fuel ratio), where $\lambda=1$ is defined as stoichiometric. As defined herein, $\lambda>1$ is a lean ratio, and $\lambda<1$ is a rich (oxygen deficient) ratio.

Combustion efficiency may increase with lean mixtures, because the limiting reagent is air rather than fuel. At rich mixtures, there will be non-combusted fuel in the exhaust, which is wasted energy. Combustion temperatures are also lower with lean mixtures, leading to reduced heat losses. Of course, there is an optimal air-fuel ratio that depends on the fuel, temperature, and pressure at the moment of ignition. A key feature of the engines described herein is that $\lambda$ can be increased far more than in conventional spark ignition engines because the instant engine is capable of operating at much higher compression ratios than conventional engines.

In one aspect, liquid water injection in the amounts and timing relative to TDC as described herein achieves more uniform mixing of fuel and air than in conventional engines. In another aspect, the high compression, along with excess oxygen (air) allow for higher temperature and pressure prior to ignition leading to higher rate and extent of combustion and consequent higher efficiency. Thus, lean mixtures are expected to decrease engine knock by increasing the auto ignition temperature. Conventionally, gasoline engines will not operate reliably at $\lambda>1.5$, but the engines described herein are expected to operate efficiently at $\lambda>1.5$ to as much as about $\lambda=8$. In an embodiment, the engines described herein operate with $\lambda$ greater than about 1.2; in another embodiment, $\lambda$ is greater than about 1.5. In another embodiment, $\lambda$ is greater than about 2.0. In another embodiment, $\lambda$ is greater than about 4.0. In another embodiment, $\lambda$ is greater than about 6.0. In an embodiment, the air to fuel ratio is in a range of about $\lambda \geq 1.2$ to about $\lambda \leq 8.0$; or about $\lambda \geq 2.5$ to about $\lambda \leq 5.5$; or about $\lambda \geq 3.5$ to about $\lambda \leq 5.0$.

The inlet air or fuel or air/fuel mixture may be heated individually or together prior to injection or inspiration into the cylinder. Heating the air or fuel or air fuel mixture can transfer useful energy from the exhaust back to the engine. Furthermore, heating the air/fuel mixture provides better and more efficient mixing of air and fuel in the cylinder, and heated liquid fuels at or below the critical state are expected to evaporate more efficiently and mix better with air. Supercritical liquid fuels will flash into vapor and mix very readily with air. In such an embodiment, a liquid fuel may be subject to a temperature and pressure condition above its critical point, where distinct liquid and gas phases do not exist. Supercritical fluids having properties between those of a gas and a liquid for use with combustion and/or compression stroke engines include, but are not limited to: Methane, Ethane, Propane, Ethylene, Propylene, Methanol, Ethanol and Acetone. The air or fuel (or both) may therefore be heated to a temperature selected from about 30° C. to about 150° C. In a further embodiment, the fuel/air mixture at the air to fuel ratio is heated before the injection of water to a value ranging from about 30° C. to about 80° C. or ranging from about 40° C. to about 80° C., or ranging from about 50° C. to about 80° C., or to a value of about 80° C. or greater before the injection of water.

Engine Temperature Control

If an embodiment where air or fuel is heated, the heat is supplied from a heat exchanger 71 or like device that captures heat from the exhaust and transfers some of the exhaust heat to the air or fuel. This is an aspect that transfers heat that would otherwise be wasted and lost to the environment to useful work. Inlet air may also be preheated in cold start conditions.

Figure 8:
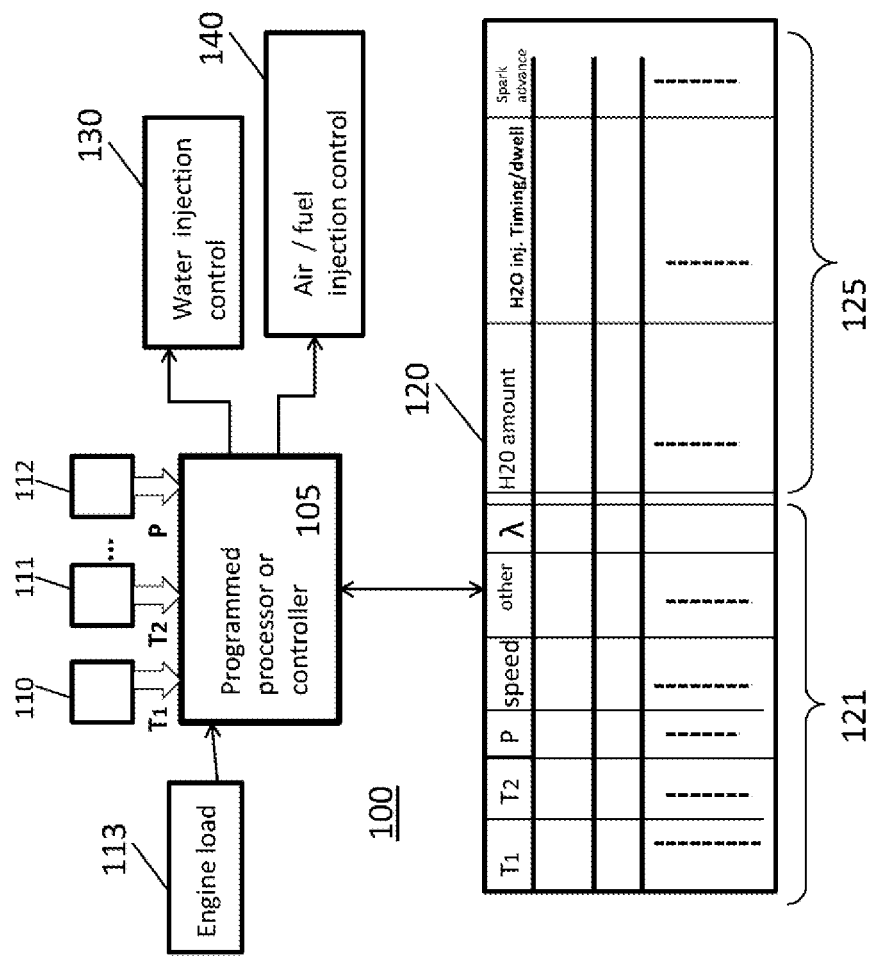
FIG. 8 illustrates a sensor control system 100 implemented in the various alternative internal combustion engines described herein in one embodiment.

In order to control the amount of cooling affected by added liquid water during the compression stroke, the engines may employ one or more temperature and pressure sensors at various locations. As shown in FIG. 8 depicting a computer control system 100 for controlling and monitoring engine system operations, temperature sensor devices 110 may be located, for example, in the inlet manifold/cylinder head, a second temperature sensor device 111 may be located in the exhaust manifold, and a pressure sensor device 112 may be located in the cylinder/inlet manifold/exhaust manifold, or any combination thereof. Temperature and pressure sensors may be located in other locations in an engine as described herein also. Other means of measuring cylinder pressure may be used, including, but not limited to, combustion chamber plasma monitoring, or crank angle acceleration monitoring. As shown in FIG. 8, one or more temperature sensors including cylinder head sensor and pressure sensors or sensors are coupled to a computer employing appropriate software and engine controls that can change the air/fuel mixture, the heating of the air or fuel (if used), and amount of liquid water added, depending on factors such as the engine temperature or required engine output/rpm. For example, an engine that is just started and is running cold may have a slightly richer mixture and less water until warmed up. When fully warm, the air/fuel mixture (and optionally temperature) and added water can be modulated to adjust the power output and engine efficiency.

The amount of cooling required is based on the maximum operating temperature of the various components of the engine, above which some part will melt or deform or lubrication may fail. The conventional solution to engine temperature control is a heat exchanger (radiator) with a fluid (engine coolant) that circulates through the engine and conveys excess heat out of the engine into the environment via the radiator. In practice, the amount of wasted heat in conventional engines as typically at least 40%. From the Carnot theorem, some of this wasted heat theoretically is thermodynamically available for conversion to mechanical energy.

Thus, in an embodiment, the engines additionally employ sufficient liquid water added during the compression stroke to cool the engine to the point that a radiator will not be necessary. In a further embodiment, the combustion engines described herein provides a method to reduce or eliminate waste heat that needs to be rejected to the environment, because of the liquid water injected into the cylinder. The amount of liquid water would be metered according to data provided by the temperature and pressure sensors. In an embodiment, the liquid water injected into the engine may be preheated by circulation from within the engine, thereby reducing heat losses to the environment. As noted elsewhere, the liquid water may be heated to about 80° C. or even higher in high pressure environments. Further features that are expected to assist in cooler internal temperatures are the lean fuel mixtures ($\lambda$>1.5), and also the high effective compression ratios. By the term "internal temperature" is meant the temperature at the cylinder head, which is typically the warmest part of an engine. The high effective compression ratios are expected to produce a cooling effect due to the greater volumetric expansion of the cylinder during the power stroke as compared to conventional lower compression ratio engines.

If the engines employ a radiator (e.g., a heat exchanger) and liquid coolant for external cooling, the amount of liquid water injection and other cooling features of the engines are expected to reduce by at least 20% the amount of cooling (heat rejected to the coolant) required as compared to conventional engines. In other embodiments, the amount of heat rejection by the coolant is reduced by at least 40% by liquid water injection as compared to an engine without liquid water injection. In other embodiments, the amount of heat rejection by the coolant is reduced by at least 60% by liquid water injection as compared to an engine without liquid water injection. In other embodiments, the amount of heat rejection by the coolant is reduced by at least 80% by liquid water injection as compared to an engine without liquid water injection. In another embodiment, a coolant is employed with higher boiling point, e.g. using higher amounts of glycol or operating the cooling loop at higher pressures to allow for a cycle running at higher temperature.

In an embodiment, the engines may further require no external means of cooling. In another embodiment, the engines may be air-cooled, lacking a heat exchanger entirely. The amount of air cooling may be controlled by either controlling speed or intermittency of an electrically powered fan or by other means such as controlling operation of a flap. For example, a flap may control the flow of air, either actively using a flap and a fan or passively by controlling the surface areas exposed and flow controlled by opening of the inlet of air and exhaust. Another way to cool the engine and recover some of the waste heat is by circulating inlet air around the engine.

In alternative embodiments, the engines may be designed to operate at a higher temperature than conventional engines. Conventional engines are typically set to run at an internal temperature of about 91° C. (195° F.), but the engines of matrix 500 described herein may be set to run at an internal temperature of 100° C. to 175° C. with suitable changes in lubricant specifications. In one embodiment, the engine operates at a cylinder temperature ranging from about 85° C. to about 175° C. (i.e., the external temperature of the engine walls that the coolant or radiator water would experience when a cooling system is employed). In combination with the additional heat management features described herein, the engine requires no external means of cooling, but optionally, can include an exhaust radiator. For example, the engine operates at an external temperature ranging from about 85° C. to about 100° C. or ranging from about 85° C. to about 120° C., or ranging from about 85° C. to about 140° C., or ranging from about 85° C. to about 150° C. and the engine requires no external means of cooling.

In alternative embodiments, the engines may be insulated to minimize environmental heat loss, with cooling only coming from the injected water, and optionally, from heat captured in the exhaust for heating air and fuel. In this embodiment, the engine will be designed to run at a higher internal temperature than a normal engine. In one embodiment, the combustion chamber or cylinder, or a portion of the engine housing the combustion chamber, or the entire engine, is optionally heat insulated by a heat insulator 90 known to one of ordinary skill in the art.

In alternative embodiments, the engines recover heat in the exhaust or engine head by a heat exchanger 70 that transfers heat from the exhaust or engine head or both to pre-heating of liquid water, fuel and inlet air. If the engine has no other external cooling apparatus, such as a radiator, or if the engine is insulated to minimize environmental heat loss, pre-heating of the fuel and liquid water can be a means to transfer heat that would otherwise be lost to the environment through the exhaust to useful mechanical energy.

As a result of the cooling measures that control the temperature in the cylinder during the compression stroke, including liquid water injection and lean fuel mixtures, greater compression ratios are possible than with conventional engines. The engines of the present disclosure have an effective compression ratio greater than 13:1, but more preferably will have an effective compression ratio of greater than 15:1, or greater than 20:1 or greater than 25:1, or greater than 30:1 and can be as high as 40:1. The higher compression ratios achievable by the engines will be more efficient than conventional engines in part because of the higher compression ratios available by the apparatus and methods. According to the Otto cycle (or diesel cycle in the case of compression ignition engines), higher compression ratios theoretically will result in greater thermal efficiencies.

The fuel used by the engines may be a low alkane, such as natural gas, methane, ethane, n-propane, or isopropane, or lower alkyl aldehyde or lower alkyl ketone, wherein lower alkyl contains 1-6 carbon atoms (e.g., acetone), or a mixture thereof. Alternatively, the fuel may be gasoline (petrol) optionally mixed with an alcohol, e.g., ethanol. Other hydrocarbons may be used as fuels in the engines, such as other C4-C15 alkanes or mixtures thereof, or diesel (kerosene) fuels. Gasoline and low alkane fuels normally will likely require spark ignition. Diesel fuels are compression ignited and the engines may use a fuel mixture based on a diesel-like fuel, e.g., Diesel, Biodiesel, Kerosene, JP-8, JP-A and other Kerosene type fuels. Both types of fuels and ignition methods are compatible with the embodiments described. In an embodiment, the fuel may be a mixture of natural gas and a diesel-like fuel, wherein the diesel-like fuel causes ignition by compression but the bulk of the charge is from natural gas.

Ignition in the engines is from a spark plug, from compression ignition or the combination or another other means such as plasma discharge or laser. In the case of spark ignition, the timing may be varied depending upon the fuel, air fuel ratio, and amount of liquid water being injected or any combination thereof. Ignition is timed to be initiated prior to TDC because the entire fuel charge does not ignite instantaneously. The process of combustion once ignition is initiated takes time, as the flame front formed on ignition moves through the cylinder. For this reason, ignition, however initiated, is timed (e.g. under computer system control), to ensure that the maximum pressure from combustion occurs at or slightly after TDC. In spark ignition engines, "spark advance" (timing of the spark) is adjusted to optimize ignition timing to maximize efficiency. The engines described herein operating with lean fuel mixtures and high compression ratios may require less spark advance, due to better and more uniform mixing of fuel and a smaller combustion compartment, so that maximum pressure from combustion will be achieved more quickly than in conventional lower compression ratio engines.

Compression ignition engines, which have no spark ignition, will typically require adjustment of the timing of the fuel being injected into the cylinder because of the water cooling in the inventive engine. Thus, with higher λ values and more water injection, which equates to cooler internal temperatures, a computer control system described herein is operated to inject a diesel-type fuel in a compression ignition engine earlier in the compression stroke in order to get appropriately timed ignition and complete combustion.

FIG. 8 further shows a sensor control system 100 that may be employed in the engines of FIGS. 2-7. The sensor control system 100 dynamically controls the engine operation by a controller device 105 an Engine Control Unit or ECU (e.g., a microprocessor or programmable logic controller or microcontroller) operating under program control that is stored in an associated memory storage device. For engine control, sensor devices are employed including, but not limited to: an MAF or (mass airflow) sensor for measuring a mass of air at the intake; an IAT (intake air temperature) sensor, e.g., in or at the cylinder head and/or the air inlet; an EGT (exhaust gas temperature) sensor, e.g., in the exhaust manifold, an MAP (Manifold Absolute Pressure) sensor in or at the inlet/exhaust manifold, or any combination thereof. The sensor devices communicate with and are coupled to controller device 105, which may be a computer with a microprocessor that sends out control signals to control and adjust engine parameters programmably in response to various engine temperature and pressure measurements, in addition to other relevant data, such as engine load, or outside air temperature and pressure.

For example, operating engine parameters may be dynamically adjusted according to power/speed output requirements of the engine (e.g., engine load) and temperature cooling targets in which the programmed microprocessor or programmable logic controller element 105 is responsive to the power setting (load) 113, e.g. such as indicated by engine RPM, and one or more engine operating conditions. For example, messages or information indicating engine operating conditions are continually sensed by sensor devices and communicate real-time values that are input to the programmable logic controller element 105 include, but are not limited to: a first temperature T1 value of the cylinder, a second temperature T2 of the cylinder at the exhaust manifold, and piston cylinder pressures P to determine the parameters for operation of the engine at a next cycle, e.g., parameters for providing control of air intake valves and/or fuel injector control and parameters for controlling liquid water injector/variable pump control.

As described herein, the amount of water injected is an amount that is greater than the amount of water that is present at the saturation point of water vapor in the ambient air in the cylinder. This amount is determinable by a skilled artisan. Standard textbooks of Thermodynamics contain a chapter/section on Humid Air. Saturation vapor mass can be approximately calculated by using ideal gas laws and Saturation Steam tables.

The amount of water vapor is constrained by the restrictions of partial pressures and temperature. Dew point temperature and relative humidity act as guidelines for the process of water vapor in the water cycle. The balance between condensation and evaporation gives the quantity called vapor partial pressure.

The maximum partial pressure (saturation pressure) of water vapor in air varies with temperature of the air and water vapor mixture. A variety of empirical formulas exist for this quantity; the most used reference formula is the Goff-Gratch equation:

$$\log_{10}(p) = -7.90298\left(\frac{373.16}{T} - 1\right) + \\ 5.02808\log_{10}\frac{373.16}{T} - 1.3816 \times 10^{-7}\left(10^{11.344\left(1-\frac{T}{373.16}\right)} - 1\right) + \\ 8.1328 \times 10^{-3}\left(10^{-3.49149\left(\frac{373.16}{T}-1\right)} - 1\right) + \log_{10}(1013.246)$$

where T, the temperature of the moist air, is given in units of Kelvin, and "p" the partial pressure of water, is given in units of millibars (hectopascals). Thus, at various temperatures, the partial pressure of water when the air is fully saturated can be determined using this formula. The amount that is injected is greater than that amount "p" calculated by this equation. For example, at 101.33 kPa and 20° C. air can have a maximum of about 1.5% vapor mass as compared to about 6.8% stoichiometric fuel mass. At 25° C. it is about 2%. In an embodiment, for example, the amount of water injected ranges from about 1.05 to about 10 times an amount of water vapor carried by air saturated with water vapor at ambient temperature of about 25° C. Thus, whatever value of "p" is calculated from the equation such as that given hereinabove, in this embodiment, the amount of water vapor injected is about 1.05 to about 10 times that value. This amount can then be converted to the amount of liquid water to be added by determining the number of moles this amount in vapor represents from the ideal gas law equation, PV=nRT, where P is the partial pressure of water to be added, V is the volume of the cylinder, T is the temperature in Kelvin, R is the ideal gas constant and n is the number of moles. Based on the number of moles of water calculated, one can calculate the amount of water to be injected in grams of water, since water has a molecular weight of 18 grams/mole. Since water has a density of about 1 gm/mL, one can then calculate the amount of liquid water to add in milliliters.

As described herein above, the optimal amount of water to be injected into the engine is calculated, for example, by the ECU (Engine Control Unit) via one or more equivalency tables. The equivalency tables contain information regarding how much water to inject into the engine under different operating conditions. One example of an equivalency table is "Water injection amount VS Intake Air Temperature (IAT) Multiplier". This is very similar to the "Ignition Timing Retard VS IAT multiplier" table electronically controlled engines have, which retard the spark timing with increasing intake air temperatures to suppress detonation, except that in the present case, the water injection amount is multiplied by a small positive number that grows with increasing IATs in order to account for the increased charge cooling demand of a hotter intake charge taking into consideration various parameters, such as the rpm of the engine, the load, the temperature, pressure, fuel, and the like. Any other factor that has an impact on the propensity of knock to occur will have a table for it in the ECU that looks at the increase in the property, and counter it by retarding spark timing, increasing fueling, and increasing/decreasing the amount of water. The primary water injection equivalency table co-relates the amount of water, fuel, and engine load.

The water injection equivalency table is generated experimentally by running injection sweeps (holding the engine at a constant speed and load and varying the amount of water injection from 0 to 100%) at various speeds and loads so that the optimum amount of water is identified under most operating conditions. Data is interpolated in between test results to produce a full matrix for the points that sit in between actual test points, so when the engine runs through various loads and speeds the ECU knows exactly how much water it needs to inject in order to keep it running optimally.

Figure 9:
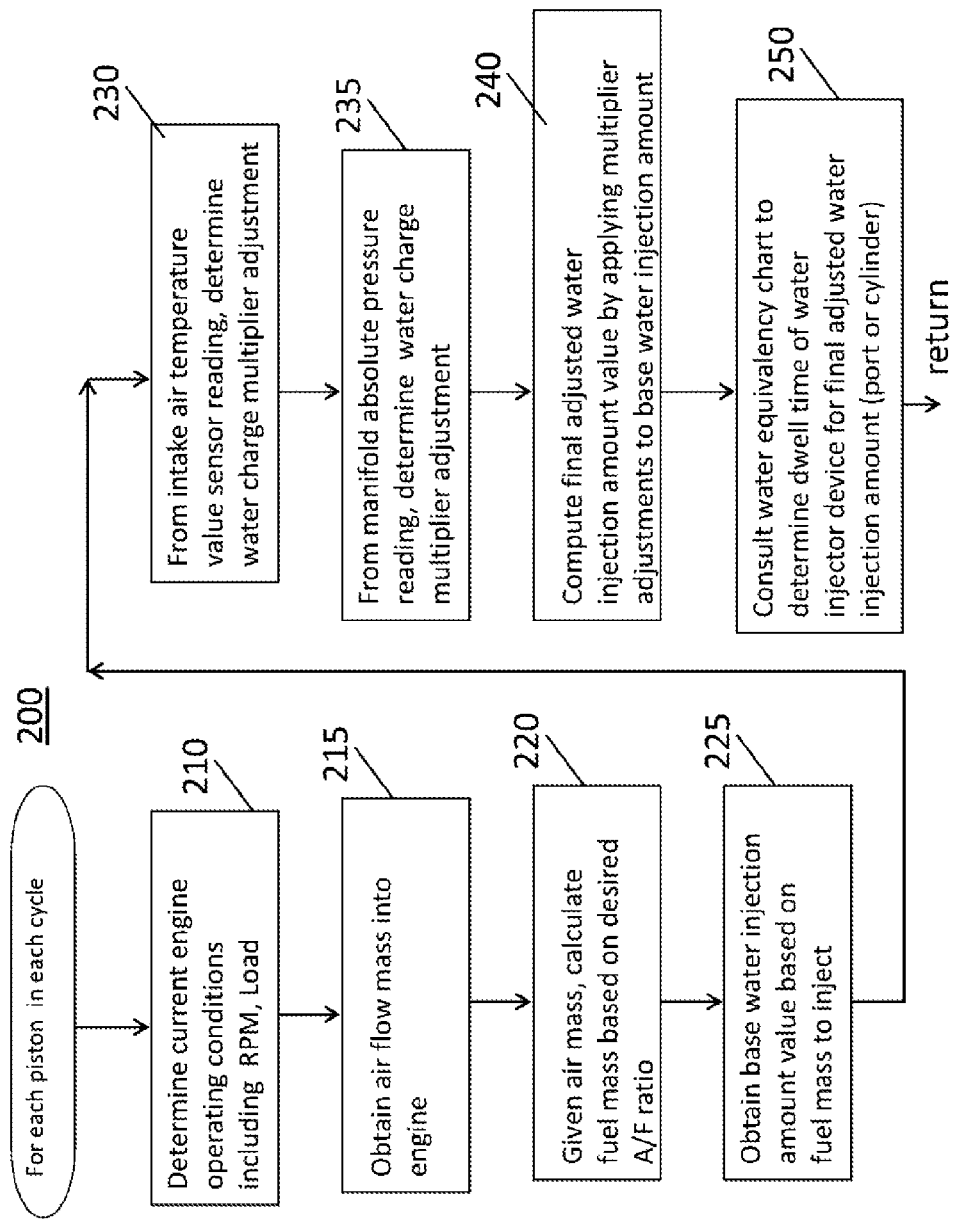
FIG. 9 illustrates a method implemented by an engine control unit for determining an amount of water to be injected per cycle in the various alternative internal combustion engines described herein in one embodiment.

More specifically, a method 200 for determining an optimal amount of water to inject for each piston per engine cycle is described in FIG. 9. At 210, FIG. 9, there is depicted the controller determining current engine operating conditions including, e.g., engine RPM, Load. Then, at 215, the air flow mass (mass of air flowing into the engine) is determinable, e.g., from the MAF, or, an equivalency table (not shown) which co-relates manifold pressure (MAP) and engine RPM to determine airflow. Alternately, air flow mass is determinable from a table relating MAF to engine speed and intake air temperature. From this determined air flow mass value, an amount of fuel is calculated at 220 given the desired A/F (air/fuel) ratio.

Then, continuing to 225, there is determined via equivalency look-up tables a base water injection amount to inject based on the determined fuel mass. As described herein, the base water amount injected, as described hereinabove, is an amount of water injected that is greater than the amount of water that is present at the saturation point of water vapor in the ambient air in the cylinder. An example method to calculate a water injection amount is described herein above.

Continuing, in FIG. 9 at 230, given the current intake air temperature value sensor reading, there is performed by the controller an equivalency table (not shown) look-up to determine a water charge multiplier adjustment. The multiplier values are experimentally determined and are provided in the equivalency table for real-time adjusting of the base injection amount (e.g., add or remove an amount of liquid water) given the current intake air temperature value sensor reading. Likewise, at 235, given the current manifold absolute pressure value sensor reading, there is performed by the controller an equivalency table (not shown) look-up to determine a water charge multiplier adjustment. Multiplier values are experimentally determined and are provided in the equivalency table for real-time adjusting of the base injection amount (e.g., add or remove an amount of liquid water) given the current manifold absolute pressure value sensor reading. It is understood that addition equivalency table look-ups may be performed to adjust water injection amount on a per cycle basis, based on other sensed parameters, e.g., exhaust gas temperature sensor values.

Continuing to FIG. 9 at 240, there is computed a final adjusted water injection amount value by applying each of the multiplier adjustments to the base water injection amount value obtained at 225. Then, at 245, the controller consults a further water equivalency chart (not shown) to determine a trigger (timing) and a dwell time for the water injector device to be opened so that the final adjusted amount of liquid water for injection (port or cylinder) is provided for the remaining portion of the cycle.

That is, referring back to FIG. 8, in one embodiment, using the predetermined information 121 stored in one or more equivalency tables 120, the logic controller element 105, will compute the control parameters 125 to effect the engine output conditions such as the amount of liquid water to be injected. These modifications are effected by the controller communicating messages 140 for controlling actuation (e.g., dwell time) of the fuel injector and communicating messages 140 to control the timing of liquid water injection and the amount (volume) (before TDC) of liquid water injection according to the embodiment described herein. At an engine cycle-by-cycle basis, given the current sensed conditions values, and in response to the current temperature and pressure readings, and other variables, e.g., environmental conditions such as ambient temperature, the controller 105 will coordinate the operation of the system by sending out control messages 140 for modifying the air and fuel injection amounts and timing, and control messages 130 that control the amount of liquid water injection (whether port or cylinder direct-injected) relative to the timing of the spark ignition (advance) at the cylinder during the compression stroke for maximum efficiency, compression and cooling as described herein.

It is understood, that the monitoring and control of the engine operations at any particular cycle of operation of the engine may be adjusted based on the operation during the prior cycle (including time average of a few prior cycles) to ensure ignition and water injections occurs at the proper crankshaft angle(s) in a stable manner.

Among other benefits, liquid water in the combustion chamber of an internal combustion engine reduce the internal temperature, which allows higher compression engines to operate without knock, thus allowing lower octane fuel to be used in higher compression and more efficient engines. The lower internal temperatures can also avoid and/or reduce $NO_x$ emissions, which increase with increased internal temperature. In addition, the engines described herein exhibit decreased amount of carbon monoxide relative to that produced by conventional engines.

As used herein, a top dead center (TDC) point of each cylinder corresponds to an orientation of the piston as at a point furthest away from the crankshaft within the cylinder. Measured in degrees, a crank angle (referring to the position of an engine's crankshaft in relation to the piston as it travels within the cylinder) for a piston that is at top dead center (TDC) of its compression stroke is zero crankshaft angle degrees. As used herein, a bottom dead center point (BDC) of each cylinder corresponds to an orientation of the piston closest to the crankshaft. A crank angle measured in degrees for a piston that is at bottom dead center (TDC) of its compression stroke is at 180 crankshaft angle degrees.

Unless indicated to the contrary, the temperatures used herein refer to ° C.

As referred herein, "ambient" is defined as the conditions of temperature and pressure outside of the energy storage system, e.g., about 25 degrees C. and 1 atm.

As used herein, the term "hydrocarbon fuel" refers to a fuel comprised substantially of hydrocarbons (more than 80% hydrocarbons by weight), but may additionally include other additives, such as alcohols, e.g., ethanol.

As used herein, the plural connotes the singular, and vice versa, the singular connotes the plural.

The following non-limiting examples are illustrative.

EXAMPLE 1

Figure 10:
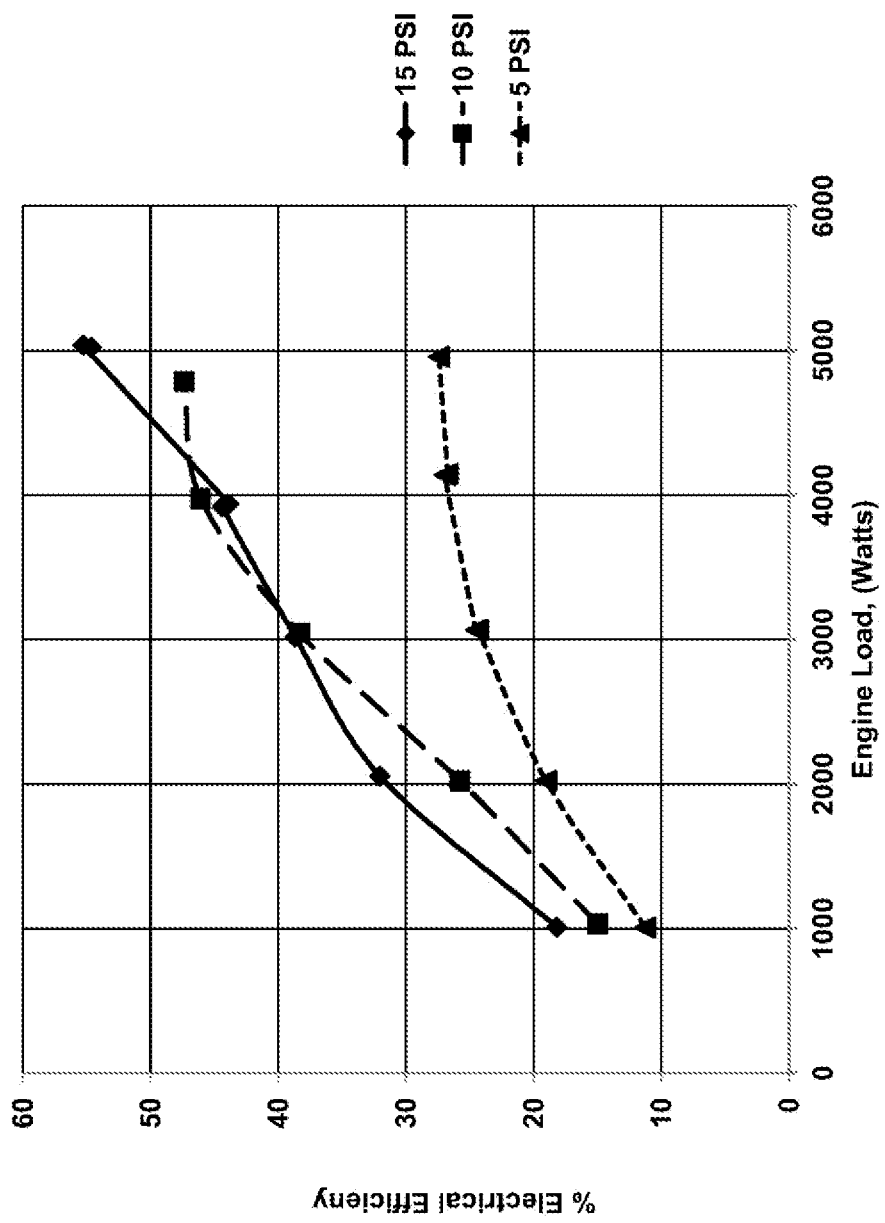
FIG. 10 depicts a plot of engine efficiency at various engine loads, with water injection and supercharged air injection pressure.

FIG. 10 depicts a plot of operating engine efficiency at various engine loads, with water injection and supercharged air injection pressure. Operating efficiency was computed based on air/fuel and injected water input as described herein. The test engine was a modified Yanmar L100 single cylinder diesel engine, coupled to a 5 KW generator having a bore x stroke of 86 mm×75 mm, 435 cc displacement, and an engine compression ratio 19:1. The engine was modified with removable plates blocking air flow to facilitate study of internal cooling. Additional holes were drilled in various locations for a water injector (e.g., by a commercially available fuel injector adapted to inject water at 80 psi), and pressure and temperature instrumentation. Air was injected with a supercharger at the indicated pressures, e.g., 5 PSI (pounds per square inch), 10 PSI and 15 PSI. Water injection was port injected at 80 psi for 3 ms at 300° before TDC. Engine speed was approximately 3600 RPM.

The electrical output shown is a direct measure of the efficiency of the engine at the various operating parameters. Efficiency was calculated by dividing measured electrical output by the thermal energy content (heat of combustion) of the fuel injected. Fuel was ULSD ultra low sulfur diesel. Particularly, FIG. 10 plots electrical efficiency of engine at various engine loads and three different supercharged air injection pressures. Table 1 shows the underlying data plotted in FIG. 10, along with the ratio of water percent to fuel (by weight), and the λ (the ratio of air to fuel). The most efficient data point in Table 1 and FIG. 10, at 15 PSI supercharged air pressure and 5037 watts engine load, was 55.3 electrically efficient. The water/fuel ratio was 1.5, meaning that the ratio was 150% w/w. The λ at the most efficient data point for this experiment was 4.46.

TABLE 1

Data for test engine with water injection and supercharging, plotted in FIG. 10

| Engine Load (Watts) | Electrical efficiency | Water/Fuel ratio | λ |
|---|---|---|---|
| 15 PSI Air Injection | | | |
| 1008 | 18.2 | 2.4 | 7.57 |
| 2055 | 32.0 | 2.1 | 6.54 |
| 3016 | 38.7 | 1.7 | 5.22 |

TABLE 1-continued

Data for test engine with water injection and supercharging, plotted in FIG. 10

| Engine Load (Watts) | Electrical efficiency | Water/Fuel ratio | λ |
|---|---|---|---|
| 3920 | 44.4 | 1.6 | 4.51 |
| 3938 | 43.9 | 2.1 | 4.46 |
| 5037 | 55.3 | 1.5 | 4.46 |
| 5020 | 54.7 | 2.1 | 4.38 |
| 10 PSI Air Injection | | | |
| 1031 | 15.0 | 2.0 | 5.72 |
| 2021 | 25.8 | 1.8 | 4.74 |
| 3045 | 38.3 | 1.7 | 4.89 |
| 3976 | 46.1 | 1.6 | 4.32 |
| 4785 | 47.4 | 1.4 | 3.65 |
| 5 PSI Air Injection | | | |
| 1006 | 11.2 | 1.5 | 4.35 |
| 2021 | 19.0 | 1.3 | 3.65 |
| 3065 | 24.3 | 1.1 | 3.05 |
| 3065 | 24.5 | 1.5 | 3.05 |
| 4138 | 27.0 | 0.9 | 2.45 |
| 4145 | 26.7 | 1.2 | 2.43 |
| 4956 | 27.4 | 0.8 | 2.02 |

FIG. 10 shows that at 10 and 15 PSI air pressure with internal cooling, the efficiency increases steadily to 4 KW engine load. At 15 PSI, the output increases further to a maximum of 55% efficiency.

EXAMPLE 2

Figure 11:
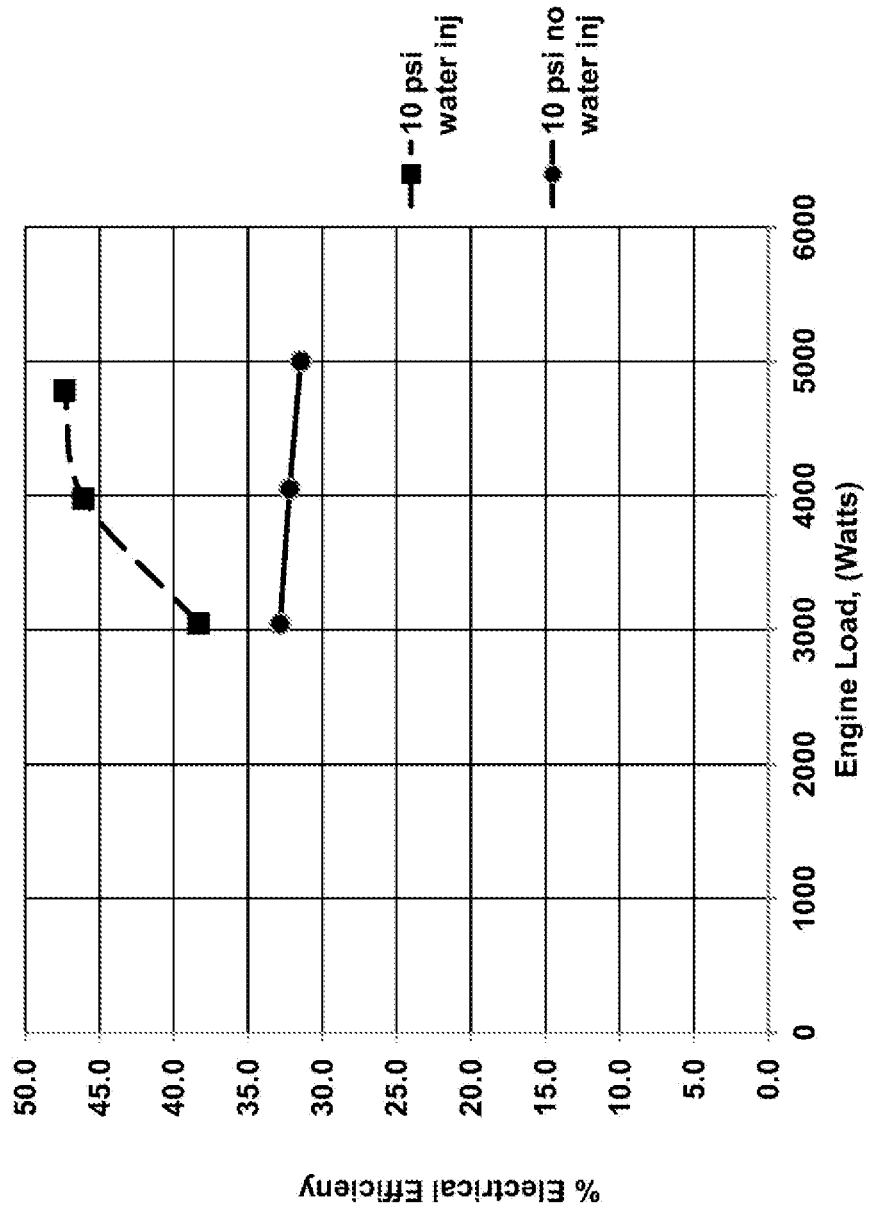
FIG. 11 shows engine efficiency at various engine loads and supercharge air injection, with and without water injection.

FIG. 11 and Table 2 show the electrical efficiency of engine at various engine loads and 10 PSI supercharged air injection pressures, comparing water injection internal cooling vs. no water injection and air cooling. Water injection was at 80 psi for 3 ms at 300° before TDC. Engine speed was 6000 RPM. The data in Table 2 shows that at 10 psi air injection, the use of water injection internal cooling dramatically increases the efficiency. At 4 KW engine load, the efficiency increases from 32 to 46%. Table 2 shows the underlying data plotted in FIG. 11, along with the water/fuel ratio, and the λ (the ratio of air to fuel).

TABLE 2

Data for test engine with at various loads and constant air pressure, without and without water injection (FIG. 11)

| Engine Load (Watts) | Electrical efficiency | Water/Fuel ratio | λ |
|---|---|---|---|
| 10 PSI Water Injection | | | |
| 3045 | 38.3 | 1.7 | 4.89 |
| 3976 | 46.1 | 1.6 | 4.32 |
| 4785 | 47.4 | 1.4 | 3.65 |
| No Water Injection | | | |
| 3044 | 32.8 | 0 | 6.09 |
| 4050 | 32.2 | 0 | 4.97 |
| 5000 | 31.5 | 0 | 3.84 |

As the engines described herein may be embodied in different forms without departing from the spirit or essential characteristics thereof, it should also be understood that the above-described embodiments are not limited by any one of the details of the foregoing description, unless otherwise specified, but rather should be construed broadly within the spirit and scope, as defined in the appended claims. Therefore, all changes and modifications that fall within the metes and bounds of the claims or equivalence of such metes and bounds are therefore intended to be embraced by the appended claims.

What is claimed is:

1. An internal combustion engine for use with a hydrocarbon fuel with at least one cylinder and a reciprocating piston therein, at least one air intake valve, at least one exhaust valve, and a fuel handling system with at least one fuel injector, said engine comprising:
   a water injector coupled to a water source for injecting liquid water into the cylinder;
   a programmed control device configured for controlling internal combustion engine operations, said programmed control device receiving one or more real-time temperature values in said engine and responsively adjusting an amount of water injected and an air to fuel ratio provided to the said at least one cylinder, said programmed control device controlling actuation of said liquid water injector to inject an amount of liquid water into the cylinder at a time from about 180° to about 30° before Top Dead Center (TDC) of said piston during a compression stroke, said liquid water injector injecting an amount of water greater than the amount of water that is present at the saturation point of water vapor in the ambient air in the cylinder and up to about 800% w/w of the amount of fuel being injected in the engine cylinder; and
   wherein the air to fuel ratio provided to said at least one cylinder is greater than stoichiometric, and the engine has an effective volume compression ratio greater than about 13:1.

2. The engine of claim 1, wherein, the fuel or water or both are directly injected into the cylinder.

3. The engine of claim 1, wherein the fuel is port injected into an intake manifold in fluid communication with the at least one air intake valve.

4. The engine of claim 3, wherein the liquid water is heated prior to injection directly into the cylinder, such that the temperature of the injected water ranges from about 40° C. to about 80° C.

5. The engine of claim 1, wherein an amount of water injected in an engine cycle is about 1.05 to about 10 times an amount of water vapor carried by air saturated with water vapor at ambient temperature of about 25° C. at an engine intake.

6. The engine of claim 1, wherein an amount of water injected in an engine cycle is about 20% w/w to about 800% w/w of the amount of fuel being injected in the engine cylinder.

7. The engine of claim 1, wherein the engine is a compression ignition engine.

8. The engine of claim 1, wherein the effective compression ratio is greater than about 15:1.

9. The engine of claim 1, wherein the effective compression ratio is greater than about 20:1.

10. The engine of claim 1, further comprising:
    a temperature sensor in the cylinder coupled to the control device for sensing a real-time temperature value in said cylinder;
    a temperature sensor in the exhaust manifold coupled to the control device for sensing a real-time temperature value of combustion exhaust products, and
    said programmed control device receiving one or more real-time temperature values from said temperature sensors for said adjusting.

11. The engine of claim 10, wherein a fuel/air mixture is modulated in response to the sensed temperature values and power output requirement of the engine.

12. The engine of claim 1, wherein the liquid water is direct injected into the cylinder as a continuous stream, as intermittent injection, or as an atomized spray, said atomized spray being finely atomized or coarsely atomized.

13. The engine of claim 1, further comprising a radiator containing a fluid coolant, wherein a sufficient amount of liquid water is injected into the cylinder so that the heat generated from the engine rejected to the coolant is reduced by at least 20% as compared to the engine run without water injection.

14. The engine of claim 1 further comprising a heat exchanger for transferring heat from the exhaust manifold or cylinder or both to provide pre-heating of water, fuel and inlet air.

15. The engine of claim 1, wherein a fuel/air mixture at said air to fuel ratio is created by mixing the fuel and air prior to injection into the cylinder.

16. The engine of claim 1, further comprising a turbocharger or supercharger that adjustably modulates a quantity of air forced into an intake manifold or the cylinder.

17. The engine of claim 1, wherein the air to fuel ratio greater than stoichiometric is expressed as a value $\lambda$, said $\lambda$ being about 1.2 or greater.

18. The engine of claim 17, wherein $\lambda$ is greater than about 1.5.

19. The engine of claim 17, wherein $\lambda$ is adjustable within the range of about 1.2 to about 8.0.

20. The engine of claim 1, wherein a fuel/air mixture is heated to a value ranging from about 30° C. to about 80° C. before the injection of water.

21. The engine of claim 1, wherein the fuel is natural gas, methane, ethane, n-propane, or isopropane, or a mixture thereof, or said fuel is selected from gasoline, or a gasoline and alcohol blend.

* * * * *

UNITED STATES PATENT AND TRADEMARK OFFICE
CERTIFICATE OF CORRECTION

PATENT NO. : 9,194,339 B2
APPLICATION NO. : 14/598935
DATED : November 24, 2015
INVENTOR(S) : Mulye Page 1 of 1

It is certified that error appears in the above-identified patent and that said Letters Patent is hereby corrected as shown below:

Title page, It Should Read:
(73) Assignee: Nostrum Energy Pte, Ltd., Singapore (SG)

Signed and Sealed this
Twenty-sixth Day of July, 2016

Michelle K. Lee
*Director of the United States Patent and Trademark Office*